US009626360B2

(12) United States Patent
Travieso et al.

(10) Patent No.: US 9,626,360 B2
(45) Date of Patent: Apr. 18, 2017

(54) ANALYZING WEB SITE FOR TRANSLATION

(71) Applicant: MOTIONPOINT CORPORATION, Coconut Creek, FL (US)

(72) Inventors: Enrique Travieso, Davie, FL (US); Adam Rubenstein, Boca Raton, FL (US); William Fleming, Boca Raton, FL (US)

(73) Assignee: MOTIONPOINT CORPORATION, Coconut Creek, FL (US)

( * ) Notice: Subject to any disclaimer, the term of this patent is extended or adjusted under 35 U.S.C. 154(b) by 861 days.

(21) Appl. No.: 13/933,815

(22) Filed: Jul. 2, 2013

(65) Prior Publication Data

US 2014/0058719 A1    Feb. 27, 2014

Related U.S. Application Data

(63) Continuation of application No. 12/609,834, filed on Oct. 30, 2009, now Pat. No. 8,566,710, which is a (Continued)

(51) Int. Cl.
*G06F 17/00* (2006.01)
*G06F 17/28* (2006.01)
(Continued)

(52) U.S. Cl.
CPC ...... *G06F 17/289* (2013.01); *G06F 17/30861* (2013.01); *H04L 67/02* (2013.01); (Continued)

(58) Field of Classification Search
CPC .................................................... G06F 17/289
(Continued)

(56) References Cited

U.S. PATENT DOCUMENTS 4,599,612 A    7/1986 Kaji
5,075,850 A    12/1991 Asahioka
(Continued)

FOREIGN PATENT DOCUMENTS

EP    0867815 A2    9/1998
EP    1130523 A2    9/2001
(Continued)

OTHER PUBLICATIONS

Office Action issued Jan. 11, 2016 in U.S. Appl. No. 12/609,778.
(Continued)

*Primary Examiner* — Stephen Hong
*Assistant Examiner* — Gregory J Vaughn
(74) *Attorney, Agent, or Firm* — Pillsbury Winthrop Shaw Pittman LLP

(57) ABSTRACT

A system, method and computer readable medium for synchronizing web content is disclosed. The method includes retrieving a first web content in a first language from a web site, the first web content corresponding to a second web content wherein the second web content is a translation in a second language of the first web content. The method further includes dividing the first web content into a plurality of translatable components and generating a unique identifier for each of the plurality of translatable components. The method further includes matching each of the plurality of translatable components to a plurality of translated components of the second web content using the unique identifier of each of the plurality of translatable components. If a translatable component is not matched to a translated component, the method further includes designating the translatable component for translation into the second language.

14 Claims, 18 Drawing Sheets

Related U.S. Application Data continuation of application No. 10/784,334, filed on Feb. 23, 2004, now Pat. No. 7,627,817.

(60) Provisional application No. 60/449,571, filed on Feb. 21, 2003.

(51) Int. Cl.
*G06F 17/30* (2006.01)
*H04L 29/08* (2006.01)

(52) U.S. Cl.
CPC ...... *Y10S 707/99942* (2013.01); *Y10S 707/99943* (2013.01); *Y10S 707/99945* (2013.01); *Y10S 707/99948* (2013.01); *Y10S 707/99953* (2013.01); *Y10S 707/99955* (2013.01)

(58) Field of Classification Search
USPC .................. 715/200, 205, 234, 264, 269
See application file for complete search history.

(56) References Cited

U.S. PATENT DOCUMENTS

| | | | |
|---|---|---|---|
| 5,608,622 A | 3/1997 | Church | |
| 5,724,593 A | 3/1998 | Hargrave, III et al. | |
| 5,802,539 A | 9/1998 | Daniels et al. | |
| 5,835,192 A | 11/1998 | Roffman et al. | |
| 5,855,020 A | 12/1998 | Kirsch | |
| 5,864,852 A | 1/1999 | Luotonen | |
| 5,974,372 A | 10/1999 | Barnes et al. | |
| 5,991,710 A | 11/1999 | Papineni et al. | |
| 6,065,026 A | 5/2000 | Cornelia et al. | |
| 6,073,143 A | 6/2000 | Nishikawa et al. | |
| 6,112,240 A | 8/2000 | Pogue et al. | |
| 6,119,078 A | 9/2000 | Kobayakawa et al. | |
| 6,122,666 A | 9/2000 | Beurket et al. | |
| 6,161,082 A | 12/2000 | Goldberg et al. | |
| 6,163,765 A | 12/2000 | Andric et al. | |
| 6,163,785 A | 12/2000 | Carbonell et al. | |
| 6,219,818 B1 | 4/2001 | Freivald et al. | |
| 6,286,006 B1 | 9/2001 | Bharat et al. | |
| 6,336,033 B1 | 1/2002 | Yamaguchi et al. | |
| 6,338,033 B1 | 1/2002 | Bourbonnais et al. | |
| 6,345,243 B1 | 2/2002 | Clark | |
| 6,347,316 B1 | 2/2002 | Redpath | |
| 6,349,275 B1 | 2/2002 | Schumacher et al. | |
| 6,349,276 B1 | 2/2002 | McCarley | |
| 6,356,894 B2 | 3/2002 | Nosohara | |
| 6,360,273 B1 | 3/2002 | Beurket et al. | |
| 6,366,894 B1 | 4/2002 | Everett et al. | |
| 6,393,389 B1 | 5/2002 | Chanod et al. | |
| 6,446,036 B1 | 9/2002 | Bourbonnais et al. | |
| 6,480,894 B1 | 11/2002 | Courts et al. | |
| 6,526,416 B1 | 2/2003 | Long | |
| 6,526,426 B1* | 2/2003 | Lakritz ............. G06F 17/2258 704/8 |
| 6,601,108 B1 | 7/2003 | Marmor | |
| 6,604,101 B1 | 8/2003 | Chan et al. | |
| 6,623,529 B1* | 9/2003 | Lakritz ............. G06F 17/2288 707/E17.109 |
| 6,657,022 B2 | 12/2003 | Williams et al. | |
| 6,662,233 B1 | 12/2003 | Skarpness et al. | |
| 6,665,642 B2 | 12/2003 | Kanevsky et al. | |
| 6,691,279 B2 | 2/2004 | Yoden et al. | |
| 6,826,593 B1 | 11/2004 | Acharya et al. | |
| 6,857,022 B1 | 2/2005 | Scanlan | |
| 6,859,820 B1 | 2/2005 | Hauduc et al. | |
| 6,869,820 B2 | 3/2005 | Chen | |
| 6,959,318 B1 | 10/2005 | Tso | |
| 6,964,014 B1 | 11/2005 | Parish | |
| 6,980,953 B1* | 12/2005 | Kanevsky ........... G06F 17/289 704/2 |
| 6,985,850 B1 | 1/2006 | Scanlan | |
| 6,993,471 B1 | 1/2006 | Flanagan et al. | |
| 6,993,473 B2 | 1/2006 | Cartus | |
| 6,996,520 B2 | 2/2006 | Levin | |
| 7,016,977 B1 | 3/2006 | Dunsmoir et al. | |
| 7,020,601 B1* | 3/2006 | Hummel ............. G06F 17/278 704/1 |
| 7,058,626 B1 | 6/2006 | Pan et al. | |
| 7,110,937 B1 | 9/2006 | Lei et al. | |
| 7,110,938 B1 | 9/2006 | Cheng et al. | |
| 7,113,960 B2 | 9/2006 | Goldfuss, Jr. et al. | |
| 7,130,792 B2 | 10/2006 | Tokieda et al. | |
| 7,139,696 B2 | 11/2006 | Tokieda et al. | |
| 7,139,898 B1 | 11/2006 | Nemirovsky et al. | |
| 7,168,040 B2 | 1/2007 | Yamamoto et al. | |
| 7,207,005 B2 | 4/2007 | Lakritz | |
| 7,216,072 B2 | 5/2007 | Kasai et al. | |
| 7,234,110 B2 | 6/2007 | Sumitomo | |
| 7,308,399 B2 | 12/2007 | Fallen-Bailey et al. | |
| 7,383,320 B1 | 6/2008 | Silberstein et al. | |
| 7,389,221 B1 | 6/2008 | Pearson et al. | |
| 7,412,374 B1 | 8/2008 | Seiler | |
| 7,418,390 B1 | 8/2008 | Jokipii | |
| 7,441,184 B2 | 10/2008 | Frerebeau et al. | |
| 7,512,532 B2 | 3/2009 | Kimpara | |
| 7,512,712 B2 | 3/2009 | Kim et al. | |
| 7,580,960 B2 | 8/2009 | Travieso et al. | |
| 7,584,216 B2 | 9/2009 | Travieso et al. | |
| 7,607,085 B1 | 10/2009 | Lassesen | |
| 7,612,712 B2 | 11/2009 | LaMance et al. | |
| 7,627,479 B2 | 12/2009 | Travieso et al. | |
| 7,627,817 B2 | 12/2009 | Travieso et al. | |
| 7,634,728 B2 | 12/2009 | Kraft | |
| 7,681,127 B2 | 3/2010 | Thurston | |
| 7,716,038 B2 | 5/2010 | Flanagan et al. | |
| 7,807,085 B2 | 10/2010 | Tsuji et al. | |
| 2001/0012991 A1 | 8/2001 | Kimpara et al. | |
| 2001/0012992 A1 | 8/2001 | Kimpara et al. | |
| 2001/0029455 A1 | 10/2001 | Chin et al. | |
| 2001/0037192 A1 | 11/2001 | Shimamoto et al. | |
| 2002/0002452 A1 | 1/2002 | Christy et al. | |
| 2002/0019839 A1* | 2/2002 | Shiu ................... G06F 9/4448 715/265 |
| 2002/0065946 A1 | 5/2002 | Narayan | |
| 2002/0078136 A1 | 6/2002 | Brodsky et al. | |
| 2002/0083068 A1 | 6/2002 | Quass et al. | |
| 2002/0091509 A1 | 7/2002 | Zoarez et al. | |
| 2002/0111787 A1 | 8/2002 | Knyphausen et al. | |
| 2002/0123879 A1 | 9/2002 | Spector | |
| 2002/0133523 A1* | 9/2002 | Ambler ............... G06F 9/4448 715/265 |
| 2002/0165885 A1* | 11/2002 | Kumhyr ............... G06F 9/4448 715/271 |
| 2003/0004703 A1 | 1/2003 | Prabhakar et al. | |
| 2003/0028889 A1 | 2/2003 | McCoskey et al. | |
| 2003/0046058 A1 | 3/2003 | Stuckler et al. | |
| 2003/0084401 A1 | 5/2003 | Abel et al. | |
| 2003/0105621 A1 | 6/2003 | Mercier | |
| 2003/0115552 A1* | 6/2003 | Jahnke ................ G06F 9/4448 715/201 |
| 2003/0120478 A1* | 6/2003 | Palmquist ......... G06F 17/2863 704/3 |
| 2003/0140316 A1* | 7/2003 | Lakritz ............. G06F 17/2258 715/201 |
| 2003/0154071 A1 | 8/2003 | Shreve | |
| 2003/0187587 A1 | 10/2003 | Swindells et al. | |
| 2003/0204573 A1 | 10/2003 | Beck et al. | |
| 2004/0049374 A1 | 3/2004 | Breslau et al. | |
| 2004/0102946 A1 | 5/2004 | Shahabuddin et al. | |
| 2004/0102956 A1 | 5/2004 | Levin | |
| 2004/0128616 A1 | 7/2004 | Kraft | |
| 2004/0167768 A1 | 8/2004 | Travieso et al. | |
| 2005/0283473 A1* | 12/2005 | Rousso ................ G06F 17/3064 |
| 2006/0271349 A1 | 11/2006 | Scanlan | |
| 2007/0033520 A1 | 2/2007 | Kimzey et al. | |

(56) References Cited

U.S. PATENT DOCUMENTS

2007/0255554 A1 11/2007 Cai
2009/0004703 A1 1/2009 Schroff

FOREIGN PATENT DOCUMENTS

| EP | 1288793 A1 | 3/2003 |
|---|---|---|
| EP | 1302867 A2 | 4/2003 |
| GB | 2359644 A | 8/2001 |
| JP | 10134052 A | 5/1998 |
| KR | 20000039748 A | 7/2000 |
| KR | 1019980055170 | 7/2000 |
| WO | 0005660 A1 | 2/2000 |
| WO | 0180036 A1 | 10/2001 |
| WO | 0193089 A1 | 12/2001 |
| WO | 02067139 A1 | 8/2002 |
| WO | 02071259 A1 | 9/2002 |
| WO | 02073464 A1 | 9/2002 |

OTHER PUBLICATIONS

"Global Readiness Assessment/Strategy", Idiom, Inc., Web Globalization Solutions, 2000, pp. 1-2.
"History of Assima Multilingual Suite", Assima Multilingual Suite History of AMS, CATS 1 & 2, 1995-1999, pp. 1-10.
"On-the-fly, Proxy-Based Localization & Customization." NetMask.it! System and Documentation: Netmask E-Mar Internet Technologies. May 30, 2002, pp. 1-36.
"Web Globalization Solutions/Overview", Idiom, Inc., Web Globalization Solutions, 2000, pp. 1-2.
"A framework for Internet Content Adaptation", A Python ICAP Server, Oct. 30, 2002, pp. 1-7, Ver. 1.2.1 http://web.archive.org/web/20030203092402/http:/icapserver.sourceforge.net/.
"Frequently Asked Questions", Globalization and localization services—TheOne Technology Group, Apr. 2001, pp. 1-3.
"SL firm says it has developed way to make Web sites multilingual" The Enterprise, Nov. 26, 2001, pp. 1, AllBusiness.com.
"The Guide from Multilingual Computing & Technology, Language Technology", Guide Getting Started, Oct./Nov. 2002, #51 Supp., pp. 1-25.
Affidavit of Christopher Butler. Recurring World Lingo reference. May 18, 2012, pp. 1-9.
Beck et al., "Enabling the Internet to Deliver Content-Oriented Services," Proceedings of Sixth International Workshop on Web Caching and Content Distribution, Jun. 20-22, 2001, pp. 1-9, Boston, MA.
Bennett, Winfield et al. "The LRC Machine Translation System." Computational Linguistics. vol. 11/ No. 2-3. Apr.-Sep. 1985, pp. 1-11.
Birchall et al., "Web gurus help retailers find a common language", FT.com Financial Times, Sep. 3, 2008, pp. 1-2.
Brandon, Jr, "Localization of Web Content", The Journal of Computing in Small Colleges, Dec. 2001, pp. 329-343, vol. 17, No. 2, Consortium for Computing in Small Colleges.
Chalabi, "Sakhr Arabic-English Computer-Aided Translation System", AMTA, 1998, LNAI 1529, pp. 518-521, Springer-Verlag Berlin Heidelberg, 1998.
Cheng, Susan. Live from Japan—an e-commerce site gets a makeover for Asia, ("Live from Japan"). Language International. Oct. 1999, pp. 1-4.
Database System Concepts, by Henry Korth and Abraham Silberschatz, pp. 283, and 286-289 (1986).
Esselink, Bert, *A Practical Guide to Localization*, published 2000, pp. 1, 8, 37, 39-40, 219, 271-272, 348, 359, 361-364, 366, 368, 371, 373, 395, 417.
Global by Design: Web Globalization News & Analysis; Dec. 2005, p. 1-31, www.bytelevel.com/glabalbydesign.
Harmandas et al., "Image retrieval by hypertext links", Computing Science, University of Glasgow, Mar. 1, 1987, pp. 1-8.

Hemenway et al, "Spidering Hacks: 100 Industrial Strength Tips and Tools", O'Reilly, Oct. 2003, pp. 1-427.
Idiom WorldServer in 20 Questions, Language International, Oct. 2001, pp. 26-29, vol. 13, No. 5.
Langewis, Chris. PowerBuilder Article—http://pbdj.sys-con.com/node/106829. PowerBuilder Journal. Mar. 1, 2002, pp. 1-6.
Lin, "Information Access across the Language Barrier: the MuST System", UCS/Information Sciences Institute, p. 1, USA (1999).
LogoVista Online Help, archived by web.archive.org on or before Feb. 19, 2002, pp. 21, 35, 37, 44, 211, 213, 305, 354, 368, 371, 418-419, 422-423, 428, 430.
Ma et al., "Content Services Network: The Architecture and Protocols", Microsoft Research China and Hewlett-Packard Laboratories, Feb. 1, 2001, pp. 1-9.
Multilingual Web Browsing with WorldLingo Tools, Press Release, Mar. 13, 2000, p. 1.
Nie, et al., "Cross-Language Information Retrieval based on Parallel Texts and Automatic Mining of Parallel Texts from the Web", Dept. d'informatique et Recherche operationnelle, Universite de Montreal, 1999, pp. 1-8.
Office Action issued on Apr. 19, 2012 in U.S. Appl. No. 95/001,916.
Office Action issued on Apr. 27, 2012 in U.S. Appl. No. 95/001,918.
Office Action issued on Apr. 5, 2012 in U.S. Appl. No. 95/001,917.
Office Action issued on May 18, 2012 in U.S. Appl. No. 95/001,919.
Office Action issued on Oct. 2, 2008 in U.S. Appl. No. 10/784,868.
Texin et al., "Using Jujitsu to Globalize Web Applications", 24th Internationalization and Unicode Conference, Atlanta, GA, Sep. 2003, pp. 21-22, 25, 27.
Trados 2.2 Translator's Workbench User Guide, copyright 1994-1999, archived by web.archive.org on or befrire Mar. 12, 1999, pp. 1-1 to C-8.
WebBudget, Oct. 2002, pp. 1-71.
WizArt WizTom 3.0 Documentation from WizTom build 3.20.1246, released Dec. 20, 2001, pp. 1, 3-6, 10-11, 20, 22-23, 27-28, 38-39, 45, 48, 51-56, 61-62, 65, 73-75, 78-80, 87, 96, 99-100, 102-103, 105-107, 110-111, 113-115, 117, 119-123, 125-128, 134, 136-137, 147, 157, 167-168, 175.
WizArt WizTom description archived by web.archive.org on or before Feb. 19, 2003, pp. 1, 3-6, 10-11, 20, 22-23, 27-28, 38-39, 45, 48, 51-56, 61-62, 65, 73-75, 78-80, 87, 96, 99-100, 102-103, 105-107, 110-111, 113-115, 117, 119-123, 125-128, 134, 136-137, 147.
WizTom for the Web Version 3 Installation Guide Windows Platform documentation ("WizTom Installation Guide"). Jul. 23, 2003, pp. 1, 9, 11.
WizTom for the Web, WizArt Software—Localization Software for Your Business, 2002, pp. 1-4.
World Lingo Translation Tools ("World Lingo") http://web.archive.org/web/20010405082721/http://www.worldlingo.com/productservices/website_translator.html Apr. 5, 2001, pp. 1-3.
WorldServer 2 White Paper, Idiom, Inc., 2000, pp. 1-19.
WorldServer 2/Software, Idiom, Inc., 2000, pp. 1-2.
WorldServer for Vignette/Software, Idiom, Inc., 2000, pp. 1-2.
Yunker, "MotionPoint Benefits from Rush to Develop Localized Web Sited for US Hispanics", Web Globalization Report Card, Web Globalization, Mar. 2007, pp. 1-2.
Zerfab, "Comparing Basic Features of TM Tools", Language Technology, Oct./Nov. 2002, pp. 11-14.
Deja Vu: Productivity system for translators, Atril Development, 2000, pp. 25, 29, 43.
Sprung, et al., "Translating into Success: Cutting Edge Strategies for Going Multilingual in a Global Age", 2000, pp. 29-30, 32-38, 40-41, 79, 136-137, 144, 205, vol. XI, John Benjamins Publishing Co., Amsterdam/Philadelphia.
SYSTRANLinks User Guide. 2002-2003, pp. 1-5.
LionBridge, ForeignDesk 5.7.0 User's Guide, Mar. 2001, Ch. 16, pp. 1-7, Ch. 18, pp. 12-13, and Ch. 21, pp. 1-40.
Floyd, "IAB Architectural and Policy Considerations for Open Pluggable Edge Services", Network Working Group, Internet Architecture Board, Jan. 2002, pp. 1-16.
Langewis, "What is Language Technology", Language Technology, Oct./Nov. 2002, pp. 4-10.

(56) References Cited

OTHER PUBLICATIONS

Maglio et al., "Intermediaries Personalize Information Streams", Enabling Technologies, Communications of the ACM, Aug. 2000, pp. 1-6, vol. 43, No. 8.
Mao et al., "A Framework for Universal Service Access using Device Ensemble", Computer Science Division, EECS Dept. University of California at Berkeley, USA, pp. 1-6, 2002.
WizTom for Cognos, WizArt, WizTom, 2001, pp. 1-12.
Wordfast User Manual, Champollion Wordfast Ltd, 2001, pp. 1-52, Version 3.35.
"Rails Internationalization (I18n) API" Sep. 19, 2009, pp. 1-14, XP55023284, http://web.archve.org/web/20090919093739/http://guides.rubyrails.org/i18n.html [retrieved on Mar. 28, 2012].
"IP geolocation is a bad way to select a UI language," XP55023282, Aug. 2009, p. 1, http://zakwilson.posterous.com/lay-off-the-geolocation-already [retrieved on Mar. 28, 2012].
Vasquez-Goyarzu et al., "[UR1] Internationalization (I18n)" The Human Communication and Interaction Research Group, Dept. of Computer Services, Mar. 1, 2008, pp. 1-3, vol. 1, No. 4, XP55023280.
"How to make clean URLs," XP55024078, May 2006, pp. 1-2, http://web.archive.org/web/20060506164758/http://www.desiquintans.com/articles.php?page=cleanurls [retrieved on . Apr. 10, 2012].
"Redirect based on referrer or IP address," May 17, 2006, XP55024072, p. 1, http://web.archive.org/web/20060719185450/http://www.phpjabbers.com/redirectbased-on-referrer-or-ip-address-php2.html [retrieved on Apr. 10, 2012].
"Typo3 CMS SEO (Part 2): Page URLs," Jun. 7, 2007, XP55023272, pp. 1-5, http://www.dawsoninteractive.com/articles/article/typo3-seo-part-2-page-urls/ (retrieve on Mar. 28, 2012].
"Web Globalization", Foreign Exchange Translations Inc., FXTrans, 2002, pp. 1-7.
"NetMask.it!® NetMask (El-Mar) Internet Technologies", Netmask (El-Mar) Internet Technologies Ltd., 2003, pp. 1-4, Israel.
D. Shaw, "Using mod_rewrite to Convert Dynamic URLs to SEO Friendly URLs", Jun. 2009, pp. 1-9.
Honomichi, "Accept-Language use for locale setting", Lionbridge, W3C International, Sep. 2003, pp. 1-3.
Shannon, "Google's "New" Static/Dynamic URL Policy is Nothing New", Sep. 23, 2008, pp. 1-2, XP55024079, www.bestrank.com/blog/googles-new-statiodynamic-urlpolicy-is-nothing-new [retrieved on Apr. 10, 2012].
Shymova et at, "Multi-language support for URL aliases," XP55024074, Aug. 2008, pp. 1-3, http://doc.ez.no/eZ-Publish/Technical-manual/a.10/Features/Multi-languagesupport-for-URL-aliases [retrieved on Apr. 10, 2012].
WorldService Methodology/Services, Idiom, Inc., 2000, pp. 1-2.
"Good International URLs," XP55024082, Oct. 2008, pp. 1-3, http://web.archive.org/web/20081026235800/http://www.internationalindustrialseo.com/ good-international-urls/ [retrieved on Apr. 10, 2012].
Multilingual Computing & Technology, The Annual Guide from Multilingual Computing & Technology: Multilingual Content Management, #45 Supplement, Jan./Feb. 2002, pp. 1-25.
Shadbolt, "The Translation Industry in Canada", Multilingual Computing & Technology, Mar. 2002, pp. 1-5, vol. 13, No. 2.
Zetzsche, "A Translator's Tool Box for the 21st Century: 43rd Annual ATA Conference", International Writers' Group, LLC, Nov. 2002, pp. 1-28, ATA 2000 Atlanta, GA.
"10 Tips to Optimize Your Web Page", In-Depth Knowledge Comprehensive Solutions, visualscopestudios, Oct. 2006, pp. 1-2.
"Alchemy Catalyst Quickstart Guide" 3.0, 2000, pp. 1-74, Alchemy Software Development Ltd.
"SDL WebFlow The quickest way to update your website in anyone's language", Web Archive, Jan. 2001, pp. 1-111, Version 3.0.
"Transit 3.0 User's Manual", Star AG, 1999, pp. 1-338, Switzerland.
"WebReaper v.9", WebReaper—Introduction, Web.Archive.Org, Mar. 30, 2001, pp. 1-49, www.webreaper.net/intro.
AltaVista 'Babelfish' translation products in use and on sale by AltaVista prior to Feb. 21, 2003, pp. 1-5, 7.
Bian et al., "Cross-Lingual Information Access to Multilingual Collection on the Internet", JASIS, Jan. 2002, pp. 281-296, vol. 51, No. 3.
Coffey, "Regular expression example: IP location", (Part 1), Nov. 19, 2008, pp. 1-2, XP55023285, http://web.archive.org/web/20081119232315/http://www.javamex.com/tutorials/regular_expressions/example_iplocation.shtml [retrieved on Mar. 28, 2012].
Coffey, "Regular expression example: IP location", (Part 2), Nov. 19, 2008, p. 1, XP55024070,http://web.archive.org/web/20081201095923/http://www.javamex.comffutorials/ regular_expressions/example_iplocation_2.shtml [retrieved on Apr. 10, 2012], Javamex UK.
Liu et al., "WebCQ—Detecting and Delivering Information Changes on the Web", Georgia Institute of Technology, College of Computing, Jan. 2000, pp. 1-8, Atlanta, GA.
Beck et at., "Example Services for Network Edge Proxies," Lucent Technologies, Nov. 21, 2000, pp. 1-28.
Giles et al., "Offloading Applications with IBM Webshere Edge Server", IBM.com, May 1, 2002, pp. 2-5.
Nie, et al., "Learning Translation Models from the Web", Proceedings of the First International Conference on Machine Learning and Cybernetics, Nov. 4-5, 2002, pp. 1999-2004, Universite de Montreal, Canada.
Luotonen, Ari, Web Proxy Servers, 1998, pp. 333-334 (Luotonen I).
SYSTRANLinks User Guide, SYSTRAN, 2001, pp. 1-17, http://www.systransoft.com/translation-support/online-services/systranlinks/userguide.
Mehta et al., "The Content Manager: A Tool to Develop Multilingual and Multi-Preference Websites", IEEE, 2001, pp. 1-7.
WizTom for the Web—Capturing Texts, Feb. 2001, pp. 1-2, http://www.wizart.com/fr/wizstart/web_capture.htm.
Savourel, Yves, "Programming a Basic Translation Database," MultiLingual Computing & Technology, vol. 11, Issue 1, Feb. 2000, pp. 44-47.
"WebPlexer", Language Automation, LAI Products, Jan. 1998, pp. 1-2.
"WebBudget 3 XT", Aquino Software, Aug. 6, 2002, pp. 1, 4-5, 7, 13, 16, 20-22, 24, 29, 32, 35-36, 38-44, 48-49, 74, 78-79, 90, 95, 100-101, 103, 139-142.
Idiom Globalization e-business, Idiom, Inc., 2000, pp. 1-202.
"Extending your business to the world", Globalization and localization services—TheOne Technology Group, Apr. 2001, pp. 1-34.
"The One Globalization & Language Translations Partners with SINA.com to Launch "SINA Translation" Which Will Deliver Web Pages in English and Chinese", Globalization and Localization Services, TheOne Technology Group, 2001, pp. 1-2.
Akers, "LogoVista E to J Internet Plus 4.0 Provides Real-Time Web Translations", Oct. 19, 1998, p. 1.
Lindsay, Machine Translations—An Important Part of your Internet Strategy, Cultivate Interaction, Oct. 2000, pp. 1-3.
Notice of Allowance for U.S. Appl. No. 12/508,198, dated Sep. 22, 2011.
Office Action issued on Oct. 21, 2011 in U.S. Appl. No. 13/096,464.
Office Action on Nov. 22, 2011 in U.S. Appl. No. 12/609,778.
Os, "Multilingual WEB sites: Best practice, guidelines and architectures", Project Report, EURESCOM, 2000, pp. 1-31.
Shadbolt, "Finding the Right Language Technology Tools", Language Tech., Oct. 1, 2002, pp. 18-21, vol. 51.
Web Site Translation, WorldLingo Products and Services, 2001, pp. 1-6.
WizTom for the Web—Step by Step, Localization Software for Your Business, 2002, pp. 1-3, http://www.wizart.com/fr/wizstart/wizweb.htm.
SYSTRAN Information and Translation Technologies, Systran Desktop Products Comparison Chart, 2002, pp. 1-2.
WizArt Software, WizTom for the Web, http://web,archive.org/web/20030608140001/http:/wizart.comien/products/web/wiztom_forthe_web.shtml, Jun. 8, 2003, pp. 1-4.

(56) References Cited

OTHER PUBLICATIONS

"Strategy Technology and Services for Managing a Global Web Presence", Idiom, Inc. Web Globalization Solutions, 1999, pp. 1-388.
SYKES, "Growth in Translation", retrieved from hnp://www.inc.com/articles/2009/08/translation.html, Aug. 4, 2009, 4 pages. (Exhibit 8).
Make Localization a Breeze, WizArt Software—Localization Software for Your Business 2002, pp. 1-152.
Notice of Allowance for U.S. Appl. No. 13/096,464 issued Sep. 19, 2012.
Office Action issued on Jan. 14, 2014 in U.S. Appl. No. 12/609,778.
Office Action issued on May 22, 2013 in U.S. Appl. No. 12/609,778.
Office Action issued on Mar. 25, 2011 in U.S. Appl. No. 12/609,778.
Office Action issued on Nov. 22, 2011 in U.S. Appl. No. 12/609,778.
Office Action issued May 29, 2015 in U.S. Appl. No. 14/573,453.

\* cited by examiner

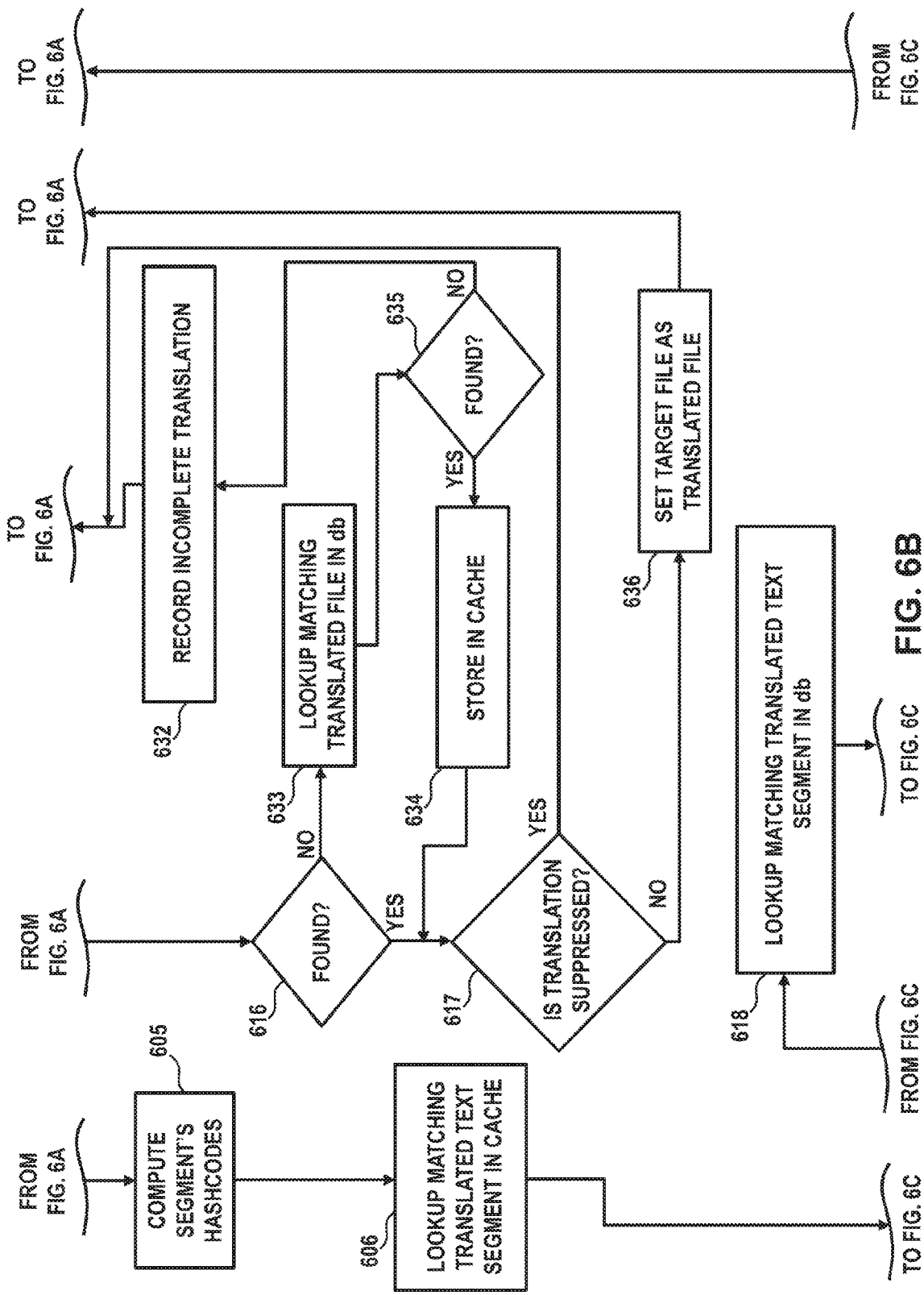

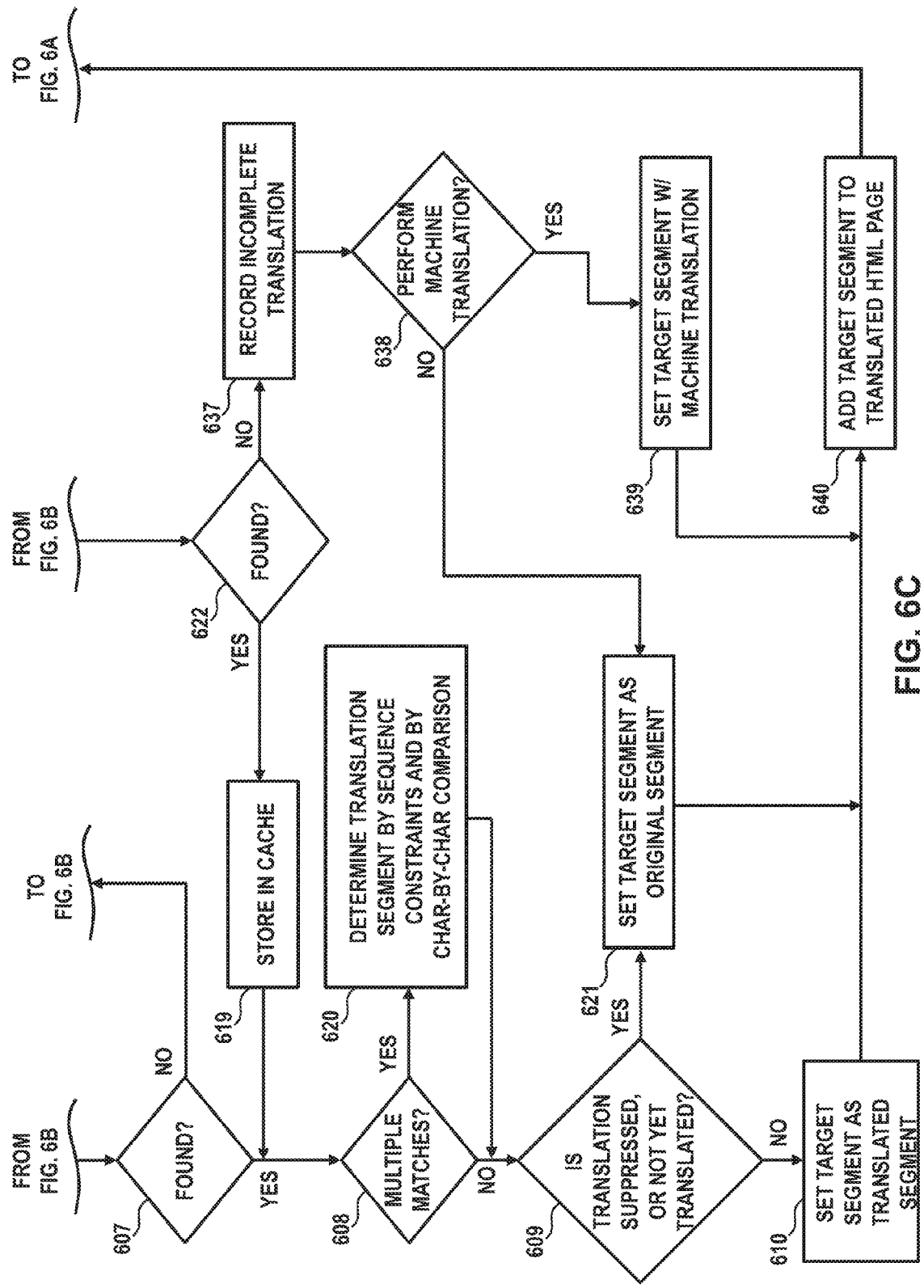

ANALYZING WEB SITE FOR TRANSLATION

CROSS-REFERENCE TO RELATED APPLICATIONS

This non-provisional application is a Continuation of U.S. patent application Ser. No. 12/609,834, entitled "ANALYZING WEB SITE FOR TRANSLATION", filed on Oct. 30, 2009, which is a Continuation of U.S. patent application Ser. No. 10/784,334, entitled "ANALYZING WEB SITE FOR TRANSLATION", filed on Feb. 23, 2004, which is a continuation-in-part of the provisional patent application Ser. No. 60/449,571 with inventors Enrique Travieso, Adam Rubenstein, and William Fleming and entitled "TRANSLATION SYSTEM ARCHITECTURE" filed Feb. 21, 2003, and commonly assigned herewith to Motionpoint Corporation, which is hereby incorporated by reference in its entirety. This non-provisional application is further related to non-provisional patent application Ser. No. 10/784,727 with inventors Enrique Travieso and Adam Rubenstein, entitled "DYNAMIC LANGUAGE TRANSLATION OF WEB SITE CONTENT;" to non-provisional patent application Ser. No. 10/784,726 with inventors Enrique Travieso, Adam Rubenstein, Arcadio Andrade and Collin Birdsey, entitled "AUTOMATION TOOL FOR WEB SITE CONTENT LANGUAGE TRANSLATION;" and to non-provisional patent application Ser. No. 10/784,868 with inventors Enrique Travieso, and Adam Rubenstein, entitled "SYNCHRONIZATION OF WEB SITE CONTENT BETWEEN LANGUAGES," all of which were filed on Feb. 23, 2004. The entire teaching and contents of these related applications are hereby incorporated herein by reference.

FIELD OF THE INVENTION

The present invention generally relates to web sites, and more particularly relates to dynamic translation of web site content to another language.

BACKGROUND OF THE INVENTION

The Internet and the world-wide web has allowed consumers to complete business transactions with organizations located across continents from the comfort of their own desk. In an increasingly global marketplace, it is becoming imperative for organizations to provide web site content in multiple languages in order to expand their customer base beyond the organization's home country. In addition, as the demographics of a country change to include foreign language speakers, it is increasingly important to communicate with those customers and potential customers in their native language. For example, several large U.S. retailers have announced that serving the Hispanic segment is now a very high priority. Some U.S. retailers have even hired Hispanic ad agencies to start marketing to the Hispanic market in their native language—Spanish.

Currently, an organization that wants to translate its web site to another language can choose from several techniques, each having significant drawbacks. One technique involves purchasing machine translation technology. Machine translation is sometimes useful to get a rough idea of the meaning of the content in a web site, but it is far from ideal. For most organizations, this type of translation, although convenient, is not practical because the quality of the translation is simply not good enough to be posted on their web sites.

Another technique involves managing the translation process by deploying human translators and either maintaining multiple web sites for each language, or re-architecting the existing web site back-end technology to accommodate multiple languages. This requires significant resources in terms of time and cost, including a high level of complexity and duplication of effort. Dynamic and e-commerce sites present additional challenges, as the information to be translated resides in multiple places (e.g., a Structured Query Language database, static Hyper Text Markup Language pages and dynamic Hyper Text Markup Language page templates) and each translated site must interface with the same e-commerce or back-end engine. Further, as the web site changes, ongoing maintenance must also be handled. This approach will yield vastly superior translations that are suitable for professional web sites of large organizations, but at great cost. Most organizations simply do not have, or do not want to invest in, the resources necessary to handle this task internally.

For example, FIG. 1 is a block diagram illustrating the system architecture of a conventional web site. The web site of FIG. 1 is presented in a first language, such as English. FIG. 1 shows a web server 112 connected to the Internet 116 via a web connection. A public user 118, such as a person using a computer with a web connection, can access the web server 112 via the Internet 116 and download information, such as a web page 114, from the web server 112 for viewing. The web server 112 is operated by programming logic 110, consisting of instructions on how to retrieve, serve, and accept information for processing. The web server 112 further has access to a database 102 of information, as well as Hyper Text Markup Language (HTML) template files 104, graphics files 106 and multimedia files 108, all of which constitute the web site served by web server 112.

FIG. 2 is a block diagram illustrating the system architecture of a conventional web site presented in two languages. The web site of FIG. 2 is presented in a first language, such as English (as shown above for FIG. 1) and in a second language, such as Spanish. FIG. 2 shows the web server 112 and the other English language components described in FIG. 1, including the database 102 of information, the HTML template files 104, graphics files 106, multimedia files 108 and programming logic 110. FIG. 2 further shows the public user 118 accessing the web server 112 via the Internet 116 and downloading information, such as a web page 202 in the English or Spanish language.

FIG. 2 also shows the Spanish language components 204 of the web site, including the database 208 of information, the HTML template files 214, graphics files 216, multimedia files 210 and programming logic 212. The aforementioned Spanish language components are managed by a multi-lingual content manager 206, which manages requests for information in the dual languages. FIG. 2 further shows that the web server 112 must be re-engineered to serve multiple sets of content in different languages.

As can be seen in the difference between FIG. 1 and FIG. 2, the deployment of the Spanish language components 204 of FIG. 2 requires a significant expenditure of time and resources. Further, the deployment requires the re-engineering of the web server 112, adding to the time and cost associated with the deployment. Additionally, once the Spanish language components 204 have been established, they must be kept synchronized with the English language components, resulting in a recurring cost. This is disadvantageous, as most organizations simply do not have the resources necessary to perform this task.

Therefore a need exists to overcome the problems with the prior art as discussed above.

SUMMARY OF THE INVENTION

Briefly, in accordance with the present invention, disclosed is a system, method and computer readable medium for synchronizing web content. In an embodiment of the present invention, the method on an information processing system includes retrieving a first web content in a first language from a web site, the first web content corresponding to a second web content wherein the second web content is a translation in a second language of the first web content. The method further includes dividing the first web content into a plurality of translatable components and generating a unique identifier for each of the plurality of translatable components of the first web content. The method further includes matching each of the plurality of translatable components of the first web content to a plurality of translated components of the second web content using the unique identifier of each of the plurality of translatable components of the first web content. If a translatable component of the first web content is not matched to a translated component of the second web content, the method further includes designating the translatable component of the first web content for translation into the second language.

Also disclosed is a web server for synchronizing web content. The web server includes a web connection for retrieving a first web content in a first language from a web site, the first web content corresponding to a second web content wherein the second web content is a translation in a second language of the first web content. The web server further includes a processor for dividing the first web content into a plurality of translatable components and generating a unique identifier for each of the plurality of translatable components of the first web content. The processor further for matching each of the plurality of translatable components of the first web content to a plurality of translated components of the second web content using the unique identifier of each of the plurality of translatable components of the first web content. If a translatable component of the first web content is not matched to a translated component of the second web content, the processor designates the translatable component of the first web content for translation into the second language.

Also disclosed is a computer program product including computer instructions for synchronizing web content. In an embodiment of the present invention, the computer instructions include instructions on an information processing system for retrieving a first web content in a first language from a web site, the first web content corresponding to a second web content wherein the second web content is a translation in a second language of the first web content. The computer instructions further include instructions for dividing the first web content into a plurality of translatable components and generating a unique identifier for each of the plurality of translatable components of the first web content. The computer instructions further include instructions for matching each of the plurality of translatable components of the first web content to a plurality of translated components of the second web content using the unique identifier of each of the plurality of translatable components of the first web content. If a translatable component of the first web content is not matched to a translated component of the second web content, the computer instructions further include instructions for designating the translatable component of the first web content for translation into the second language.

The preferred embodiments of the present invention are advantageous because of the ease of implementation of the disclosed systems. As discussed below, the present invention allows for the deployment of a corresponding web site in another language with a reduced amount of configuring of the original web site. This reduces the amount of Information Technology (IT) resources that must be consumed by the providers of the original web site and reduces the amount of time necessary for deployment. Also as discussed below, only a single link is required to be deployed on the original web site in order to provide access to the corresponding web site in another language. This is beneficial as it reduces the amount of time and effort that must be expended by the providers of the original web site in order to release the corresponding web site in another language.

The present invention is further advantageous because it allows for the use of human translation, thereby producing a high quality translation of the original web site in another language. This is beneficial as it reduces or avoids the use machine translation, which can be of low quality. Additionally, the present invention preserves the formatting of the original web site, including when a translation is of a larger size or length that the original text. This is beneficial as it allows for the preservation of the look and feel of the original web site, thereby allowing users to maintain familiarity with the corresponding web site in another language.

The present invention is further advantageous because it supports large, complex and rapidly-changing web sites. As explained in greater detail below, the present invention supports web sites with any number of web pages, links, downloads and other materials, thereby allowing for greater flexibility and usability of the present invention. The present invention also supports web sites that change continuously or periodically, as it regularly polls the web site to discern changes and initiate corresponding translations. This is beneficial as it reduces the amount of time and effort that is expended on the maintenance of a corresponding web site in another language.

The present invention is further advantageous because it provides a corresponding web site in a second language, thereby meeting the needs of customers speaking the second language. This is beneficial as it generates traffic consisting of customers speaking the second language and provides customers speaking the second language a self-service e-commerce option. This is also beneficial because it provides more accessible shopping opportunities for customers in the second language and provides a more user-friendly environment for these clients in the second language.

BRIEF DESCRIPTION OF THE DRAWINGS

FIGS. 6A-6C illustrate an operational flow diagram depicting the serving process of the translation server, according to a preferred embodiment of the present invention.

FIG. 9 is a screenshot of a WebCATT interface used for viewing a translatable component, in one embodiment of the present invention.

FIG. 10 is a screenshot of a WebCATT interface used for viewing a translatable component along with a corresponding translation, in one embodiment of the present invention.

FIG. 11 is a screenshot of a WebCATT interface used for editing a translatable component, in one embodiment of the present invention.

FIG. 12 is a screenshot of a WebCATT interface used for viewing a translation queue, in one embodiment of the present invention.

DETAILED DESCRIPTION

The present invention, according to a preferred embodiment, overcomes problems with the prior art by providing an efficient and easy-to-implement system and method for dynamic language translation of a web site.

Overview

Figure 1:
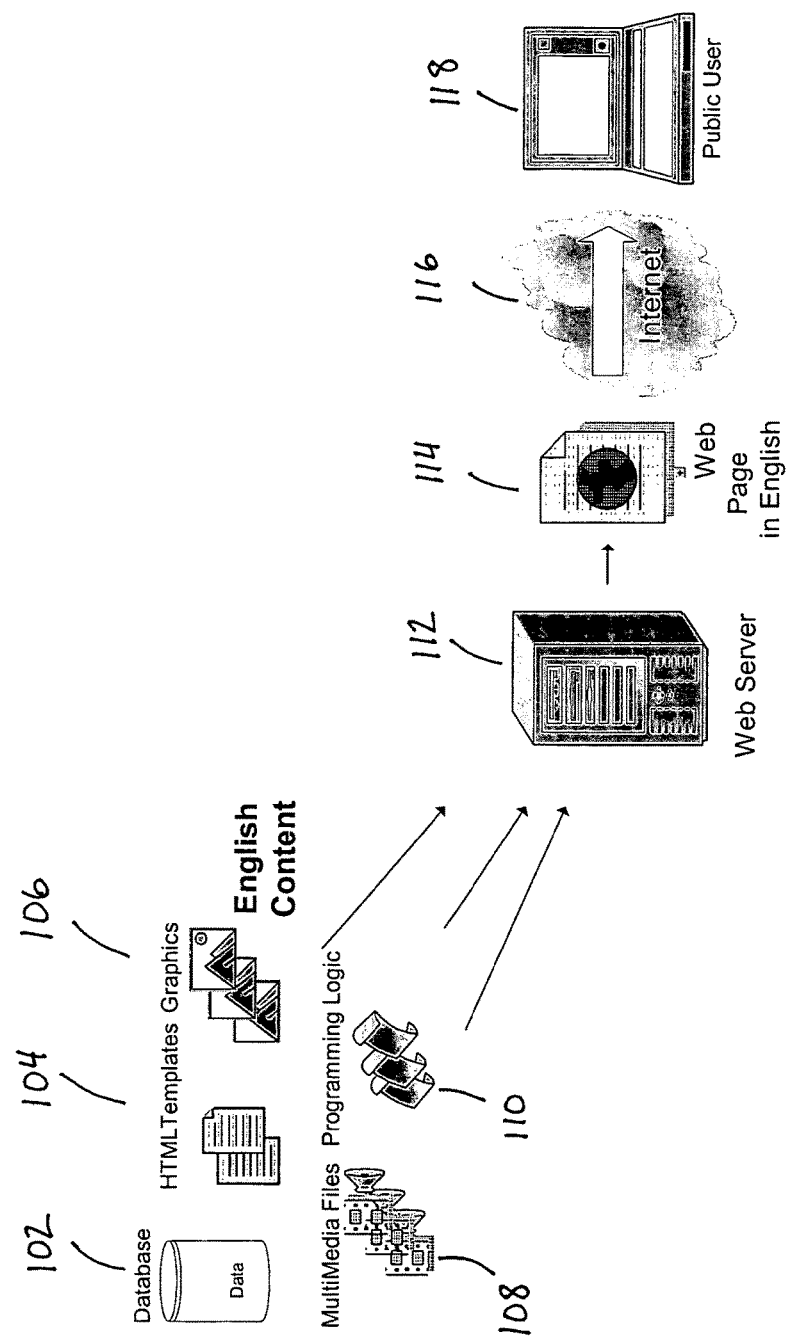
FIG. 1 is a block diagram illustrating the system architecture of a conventional web site.
Figure 3:
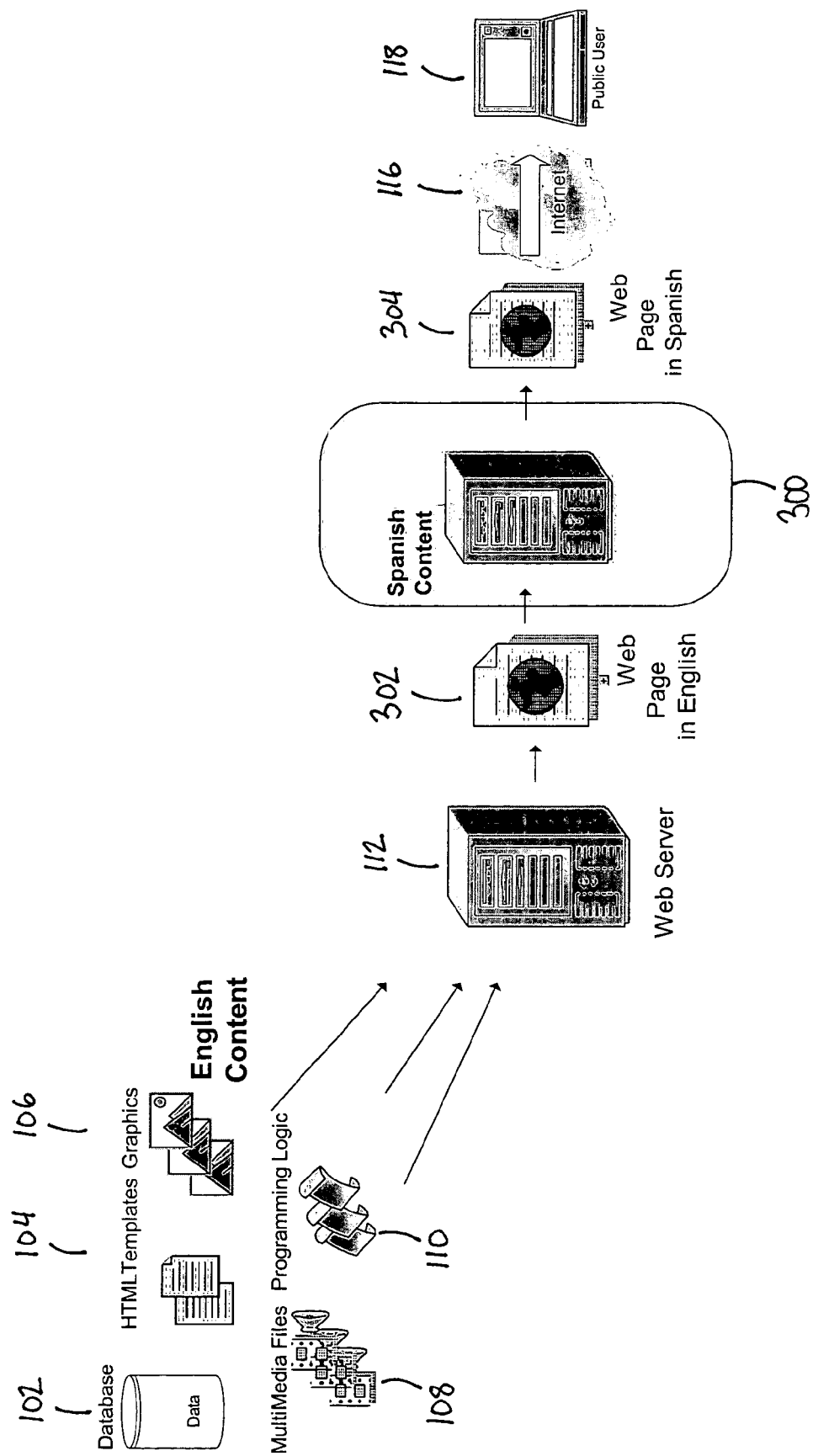
FIG. 3 is a block diagram illustrating the system architecture of a web site presented in two languages, in one embodiment of the present invention.

FIG. 3 is a block diagram illustrating the system architecture of a web site presented in two languages, in one embodiment of the present invention. The web site of FIG. 3 is presented in a first language, such as English, and a second language, such as Spanish. FIG. 3 shows the web server 112 of FIG. 1 connected to the Internet 116 via a web connection. Also as shown in FIG. 1, a public user 118 accesses the web server 112 via the Internet 116 and downloads information, such as a web page, from the web server 112 for viewing. The user 118 utilizes a client application, such as a web browser, on his client computer to connect to the web site of via the network 116. Once connected to the web site, the user 118 browses through the products or services offered by the web site by navigating through its web pages.

The web server 112 is operated by programming logic 110 and the web server 112 further has access to a database 102 of information, as well as HTML template files 104, graphics files 106 and multimedia files 108, all of which constitute the English components of the web site served by web server 112.

FIG. 3 further shows translation server 300 situated apart from and existing independently from the web server 112. The translation server 300 embodies the main functions of the present invention, including the provision of a web site in a secondary language, such as Spanish. The translation server 300 provides the secondary language components of a base web site, which is provided by web server 112, without requiring integration with the base web site or re-configuring or re-engineering of the web server 112.

Figure 2:
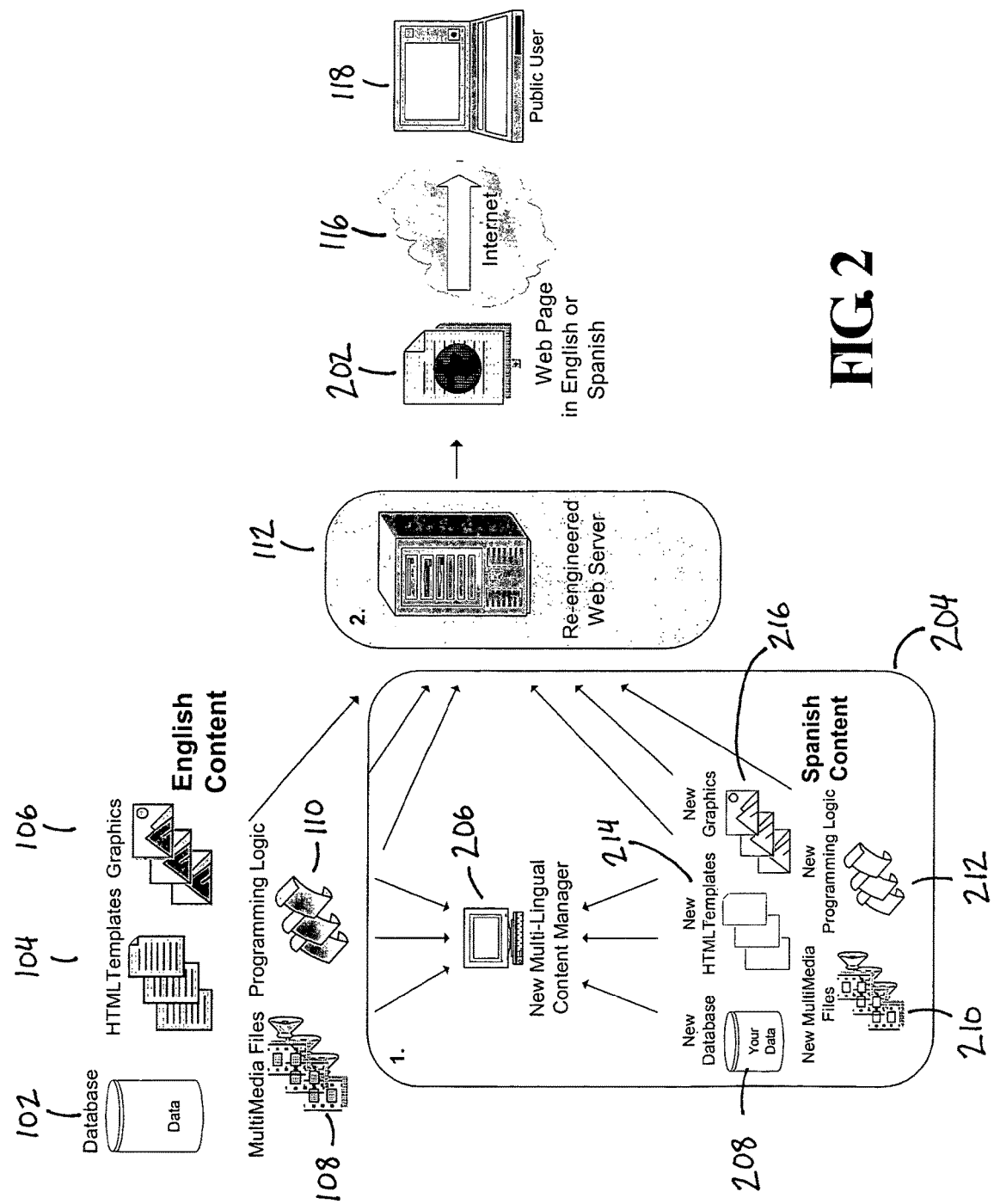
FIG. 2 is a block diagram illustrating the system architecture of a conventional web site presented in two languages.

As can be seen in the difference between FIG. 2 and FIG. 3, the deployment of the secondary language components FIG. 3 requires a significantly reduced expenditure of time and resources than the deployment of FIG. 2. Further, the deployment of FIG. 3 does not require the re-engineering of the web server 112. Additionally, once the secondary language components have been established by the translation server 300, they are automatically kept synchronized with the English language components of the base web site. Thus, the system of the present invention is advantageous as it reduces the amount of time, effort and resources that are required to deploy a secondary language web site.

Figure 4:
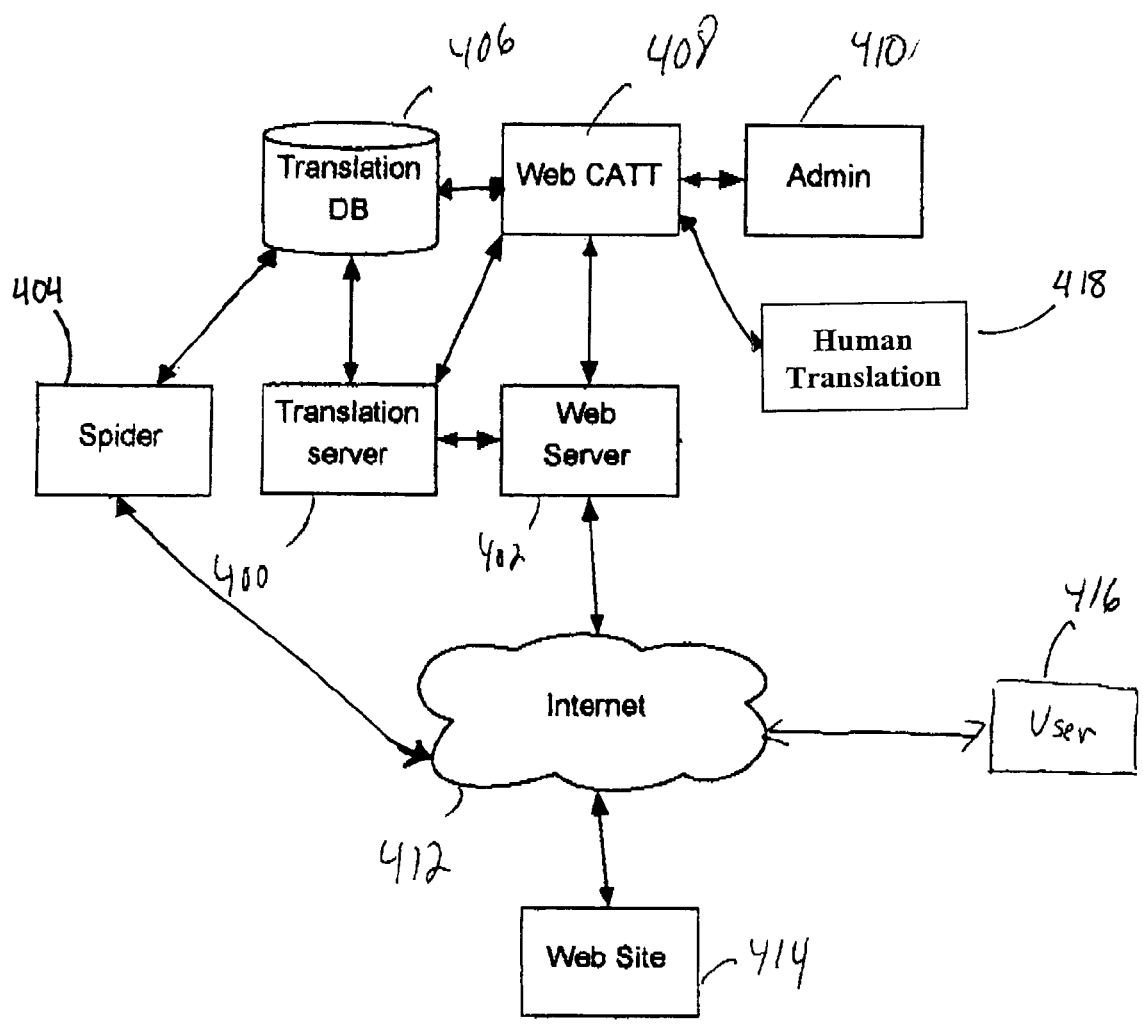
FIG. 4 is a block diagram illustrating the system architecture of the present invention, in one embodiment of the present invention.

FIG. 4 is a block diagram illustrating the system architecture of the present invention, in one embodiment of the present invention. FIG. 4 presents an alternative point of view of the system architecture of the present invention. FIG. 4 shows a web site 414 representing a web site in a first language such as English that is connected to the Internet 412 via a web connection. FIG. 4 further shows a user 416 that utilizes a web connection to the Internet 412 to browse and navigate the web pages served by the web site 414.

FIG. 4 further shows the translation server 400, corresponding to the translation server 300 of FIG. 3, and a translation database 406 for use by the translation server 400 in storing of translatable components during the serving of web pages in a secondary language such as Spanish. This process is described in greater detail below. Also shown in FIG. 4 is the Web Computer Aided Translation Tool (WebCATT), which is a tool for aiding a human 418 or an admin 410 in translating the components of a web site in a first language. Further shown is a spider 404 for use in analyzing and sizing a web site 414. The translation server 400, and WebCATT tool 408 are connected to a web server 402, which is the conduit through which all web actions of the above tools are channeled. The translation server 400, WebCATT tool 408 are described in greater detail below.

In an embodiment of the present invention, the computer systems of translation server 400, WebCATT tool 408, spider 404 and web server 402 are one or more Personal Computers (PCs) (e.g., IBM or compatible PC workstations running the Microsoft Windows 95/98/2000/ME/CE/NT/XP operating system, Unix, Linux, Macintosh computers running the Mac OS operating system, or equivalent), Personal Digital Assistants (PDAs), game consoles or any other information processing devices. In another embodiment of the present invention, the computer systems of translation server 400, WebCATT tool 408, spider 404 and web server 402 are server systems (e.g., SUN Ultra workstations running the SunOS operating system or IBM RS/6000 workstations and servers running the AIX operating system).

In one embodiment of the present invention, Internet network 412 is a circuit switched network, such as the Public Service Telephone Network (PSTN). In another embodiment of the present invention, the network 412 is a packet switched network. The packet switched network is a wide area network (WAN), such as the global Internet, a private WAN, a local area network (LAN), a telecommunications network or any combination of the above-mentioned networks. In another embodiment of the present invention, network 412 is a wired network, a wireless network, a broadcast network or a point-to-point network.

Translation Server

Introduction

The translation server 400 is the back-end application responsible for the conversion of web pages to another language. The translation server 400 parses each incoming HTML page into translatable components, substitutes each incoming translatable component with an appropriate translated component, and returns the translated web page back to the online user 416. Page conversion is performed on the fly each time an online user 416 requests a page in the second or alternate language. When a web page is received for conversion, the translation server 400 will translate the page if enough translated content is available to meet a customer specified translation threshold. If this is not the case, then the page will be returned in the first or original language.

A translatable component includes any one of a text segment, an image file with text to be translated, a multimedia file with text or audio to be translated, a file with text to be translated, a file with image with text to be translated, a file with audio to be translated and a file with video with at least one of text and audio to be translated.

The page conversion process follows seven major steps. In a first step, for each text segment encountered, if a translation is available it replaces it with the translated text segment. If no translation is available, either the text remains in the original language or a machine translation is performed on the fly, depending on the customer's preference. In a second step, for each linked file (images, PDF files, Flash movies, etc.) encountered, if a translated file is available the HTML link tag is rewritten so that it points to the translated file. If a translated file is not available, the original link tag is left untouched. In a third step, any relative Universal Resource Locator (URL) found in the page is converted to an absolute URL. This is necessary because the browser resolves relative URLs based on the URL of the current page. In the case of a translated page, the URL of the page is actually in the translation server 400. As a result, the browser would request all files and links with relative URLs from the translation server 400, which is not the correct original location.

In a fourth step, each JavaScript block is parsed for directive tags that indicate text content to translate. Images are automatically detected by recognition of the file extension. Script tags that reference external JavaScript files are rewritten so that they are redirected to the translation server 400. They are then parsed and translated in a separate browser Hyper Text Transfer Protocol (HTTP) request. In a fifth step, each link to another web page is rewritten so that the original URL is redirected to the translation server 400. When an online user clicks on a rewritten link, the request then goes directly to the translation server 400 and the page is in turn translated. Links to other web pages placed in JavaScript blocks are automatically recognized, either by extension or by pre-defined customer specific URL patterns, and also rewritten for redirection. This feature, which keeps the user in the alternate language as they browse the site, is called "implicit navigation".

In a sixth step, for each directive tag or attribute found, the appropriate instruction is performed. In a seventh step, the translation server 400 automatically schedules the web page for translation by placing it in the WebCATT 408 translation queue, in the event a translation cannot be found for one or more text segments or linked files in the page.

Figure 5:
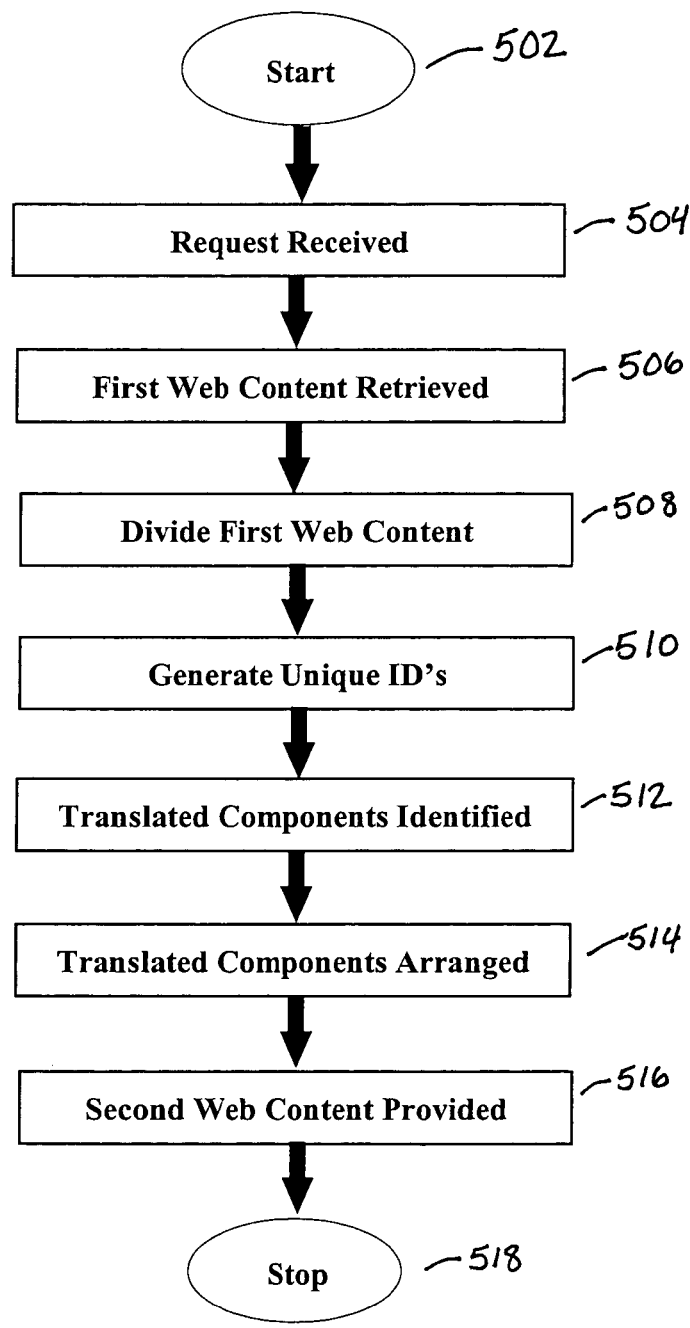
FIG. 5 is an operational flow diagram depicting the process of the translation server, according to a preferred embodiment of the present invention.

FIG. 5 is an operational flow diagram depicting the process of the translation server 400, according to a preferred embodiment of the present invention. The operational flow diagram of FIG. 5 depicts the process of the translation server 400 of responding to a user request for a web page in a secondary language. The operational flow diagram of FIG. 5 begins with step 502 and flows directly to step 504.

In step 504, the translation server 400 receives a request from a user 416 on a web site 414, the web site 414 having a first web content in a first language such as English. The request, such as an HTTP request or a Simple Mail Transfer Protocol (SMTP) request, calls for a second web content in a second language such as Spanish. The second web content is a human or machine translation in a second language of the first web content. The first language includes any one of English, French, Spanish, German, Portuguese, Italian, Japanese, Chinese, Korean, and Arabic and the second language is different than the first language and includes any one of English, French, Spanish, German, Portuguese, Italian, Japanese, Chinese, Korean, and Arabic.

In step 506, the translation server 400 retrieves the first web content from the web site 414. In step 508, the translation server 400 divides the first web content into a plurality of translatable components. In step 510, the translation server 400 generates a unique identifier for each of the plurality of translatable components of the first web content. For a text segment, the translation server 400 can generate a unique identifier using a hash code, a checksum or a mathematical algorithm.

In step 512, the translation server 400 identifies a plurality of translated components of the second web content using the unique identifier of each of the plurality of translatable components of the first web content. In step 514, the translation server 400 arranges or puts the plurality of translated components of the second web content to preserve a format that corresponds to the first web content. The translation server 400 can arrange or put the plurality of translated components of the second web content to preserve a format that corresponds to the first web content, including putting formatting tags that are not visible in the first web content. In step 516, the translation server 400 provides the second web content in response to the request that was received. In step 518, the control flow of FIG. 5 stops.

Figure 6A:
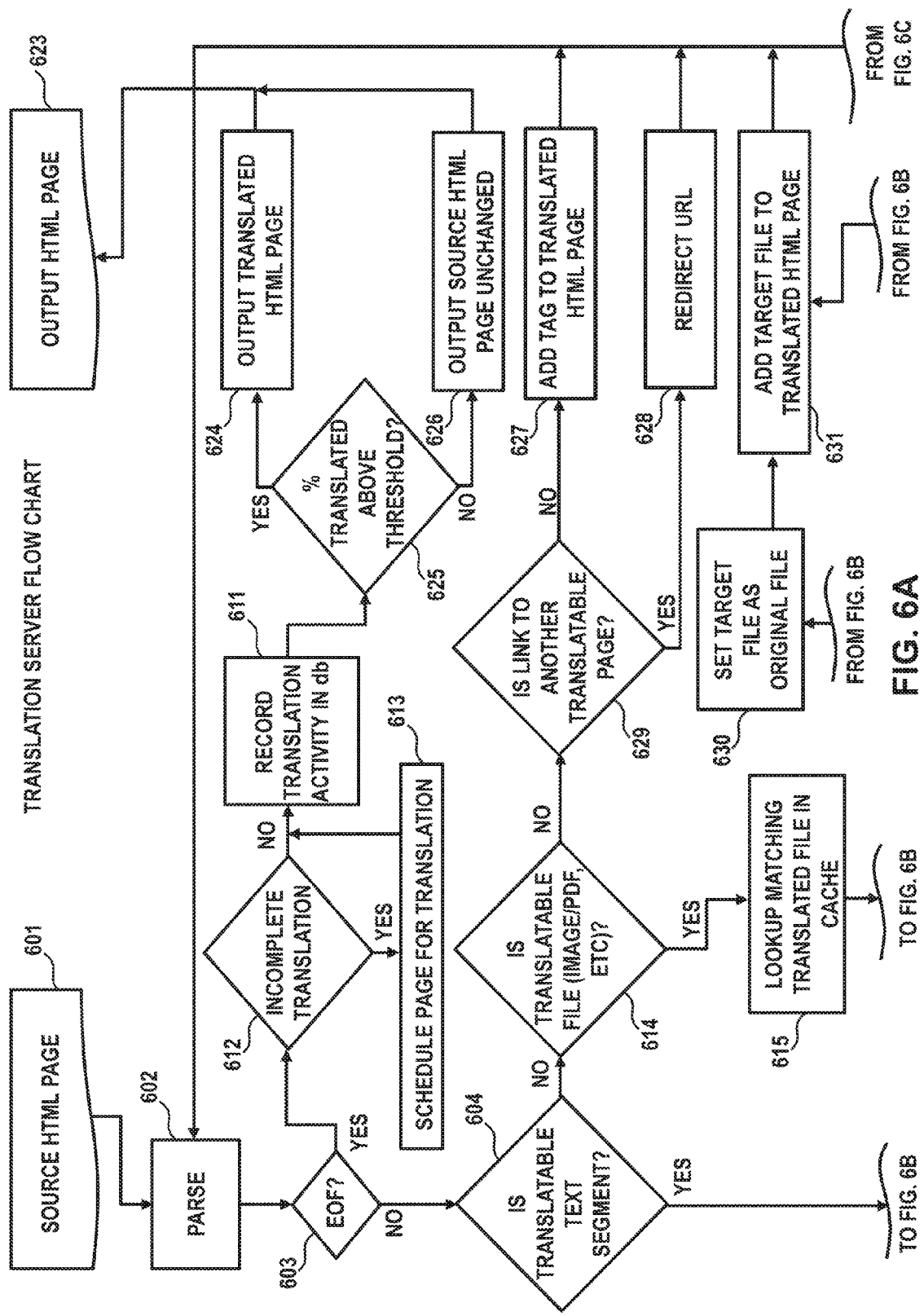

FIGS. 6A-6C illustrate an operational flow diagram depicting the serving process of the translation server 400, according to a preferred embodiment of the present invention. The operational flow diagram of FIGS. 6A-6C depicts the process of the translation server 400 of providing a web page in a secondary language in response to a user request. Specifically, the operational flow diagram of FIGS. 6A-6C provides more detail with regards to steps 508-514 of FIG. 5 above. The operational flow diagram of FIGS. 6A-6C begins with step 601 and flows directly to step 602.

Step 601 begins with a source HTML page or first web content of step 506 of FIG. 5. In step 602, at least one portion of the first web content is parsed into a translatable component. In step 603, it is determined whether the end of the file of the first web content is reached. If the result of the determination is affirmative, then control flows to step 612. Otherwise, control flows to step 604. In step 604, it is determined whether the translatable component that was parsed in step 602 is a text segment. If the result of the determination is affirmative, then control flows to step 605. Otherwise, control flows to step 614.

In step 605, a hash code or other unique identifier is computed for the text segment. In step 606, using the unique identifier, a matching translated text segment is looked up in a cache. In step 607, it is determined whether the matching translated text segment is found in the cache. If the result of the determination is affirmative, then control flows to step 608. Otherwise, control flows to step 618. In step 608, it is determined whether there was multiple matching translated text segments found in the cache. If the result of the determination is affirmative, then control flows to step 620. Otherwise, control flows to step 609. In step 620, the correct translated segment is determined using the sequence constraints and a character by character comparison. In step 609, it is determined whether translation of the text segment is suppressed or not yet translated. If the result of the determination is affirmative, then control flows to step 621. Otherwise, control flows to step 610.

In step 610, the matching translated text segment is set as a target segment. In step 621, the current text segment is set as the target segment. In step 640, the target segment is added to the output web content, or second web content (i.e., the translated HTML page or the output HTML page). In step 623, the second web content is output for provision to the user requesting the web page.

In step 612, it is determined whether there is an incomplete translation of the current web page, i.e., the first web content. If the result of the determination is affirmative, then control flows to step 613. Otherwise, control flows to step 611. In step 613, the current web page is scheduled for translation. In step 611, the translation activity performed by the translation server 400 in servicing the current web page is recorded in the translation database 406. In step 625, it is determined whether the percentage of the current web page, i.e., the first web content, is translated is above a threshold. If the result of the determination is affirmative, then control flows to step 624. Otherwise, control flows to step 626. In step 624, the second web content or translated HTML page is output for provision to the user requesting the web page. In step 626, the current web page or first web content is output unchanged for provision to the user requesting the web page.

In step 614, it is determined whether the translatable component parsed in step 602 is a translatable file such as a PDF file, an image file, etc. If the result of the determination is affirmative, then control flows to step 615. Otherwise, control flows to step 629. In step 629, it is determined whether the translatable component parsed in step 602 is a link to another translatable page. If the result of the determination is affirmative, then control flows to step 628. Otherwise, control flows to step 627. In step 627, a tag is added to the translated HTML page to indicate a link (this is described in greater detail below). In step 628, the link is modified to redirect the URL (this is described in greater detail below).

In step 615, a translated file corresponding to the translatable file is looked up in a cache. In step 616, it is determined whether the translated file was found. If the result of the determination is affirmative, then control flows to step 617. Otherwise, control flows to step 633. In step 633, the translated file is looked up in the translation database 406. In step 635, it is determined whether the translated file was found. If the result of the determination is affirmative, then control flows to step 634. Otherwise, control flows to step 632. In step 634, the translated file that was found is stored in the cache. In step 632, an incomplete translation is recorded in the translation database 406. In step 630, the original web page is set as the target file. In step 631, the target file is added to the translated HTML page.

In step 617, it is determined whether translation is suppressed for the translatable file. If the result of the determination is affirmative, then control flows to step 630. Otherwise, control flows to step 636. In step 636, the translated file is set as the target file. In step 618, the using the unique identifier, a matching translated text segment is looked up in the translation database 406. In step 622, it is determined whether the matching translated text segment is found in the database. If the result of the determination is affirmative, then control flows to step 619. Otherwise, control flows to step 637. In step 619, the translated segment that was found is stored in the cache. In step 637, an incomplete translation is recorded in the translation database 406.

In step 638, it is determined whether a machine translation of the text segment can be performed. If the result of the determination is affirmative, then control flows to step 639. Otherwise, control flows to step 621. In step 639, the machine translation is set as the target segment.

ASP Model

The translation server 400 can be presented in a variety of models. In the Application Service Provider (ASP) model, the translation server 400 converts full web pages or script files at a time and delivers them directly to the online user 416. Under this model, the links in a web page are rewritten so that the request is redirected to the translation server 400. For example, the URL of the translation server 400 for a fictional customer called ABC Widgets is defined as: http://trans1.motionpoint.net/abcwidgets/enes/

Then the link <a href="http://www.abcwidgets.com> would be rewritten as follows: <a href="http://trans1.motionpoint.net/abcwidgets/enes/?24; http://www.abcwidgets.com">

Clicking on the above rewritten link results in the browser request being sent to the translation server 400. The translation server 400 in turns reads the original URL passed in the query string (i.e., everything after the question mark), requests the page from the ABC Widgets server, converts it to the alternate language, and sends it back to the user 416.

Figure 7:
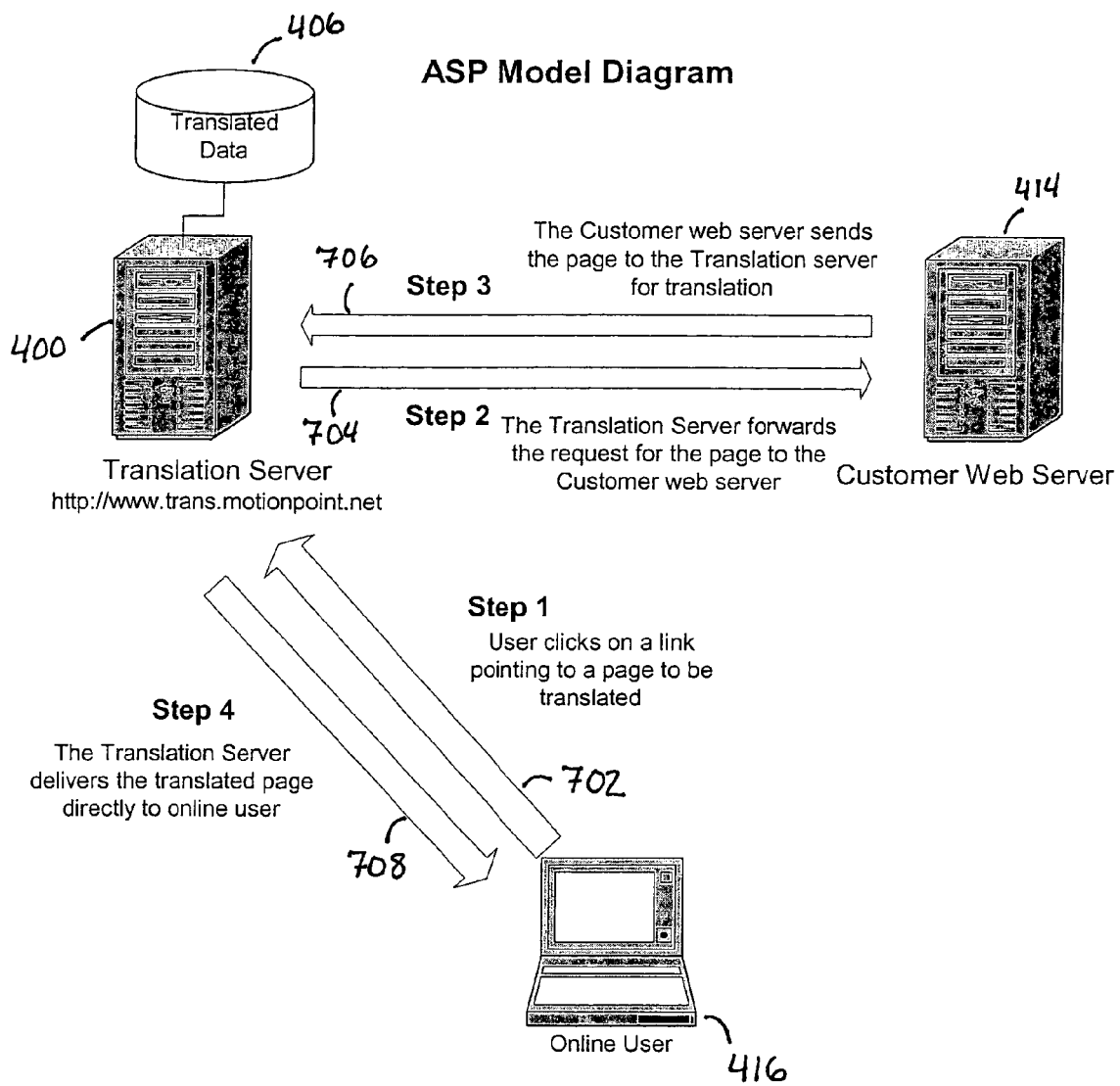
FIG. 7 is a block diagram depicting the serving process in an ASP model of the translation server, according to a preferred embodiment of the present invention.

FIG. 7 is a block diagram depicting the serving process in an ASP model of the translation server 400, according to a preferred embodiment of the present invention. In a first step 702, the user 416 clicks on a link of a web page in a first language on the web site 414. The link points to a page to be translated. The translation server 400 receives the request and processes it. In a second step 704, the translation server 400 forwards the request to the web site 414 and in a third step 706, the web site 414 provides the page to the translation server 400 for translation. In a fourth step 708, the translation server 400 translates the page using the translations in the translation database 406 and sends the translated page to the user 416.

Web Service Model

In the web service model, the translated content is not delivered directly to the online user 416. Instead the customer's web site server 414 issues the request for translation to the translation server 400, which acts as a web translation service. Under this model, the translation server 400 can convert full pages or just specific text segments and/or files. When directly translating text segments or files, multiple translation requests can be issued, one per segment or file, or multiple segments and files can be translated in a single hatched request.

Figure 8:
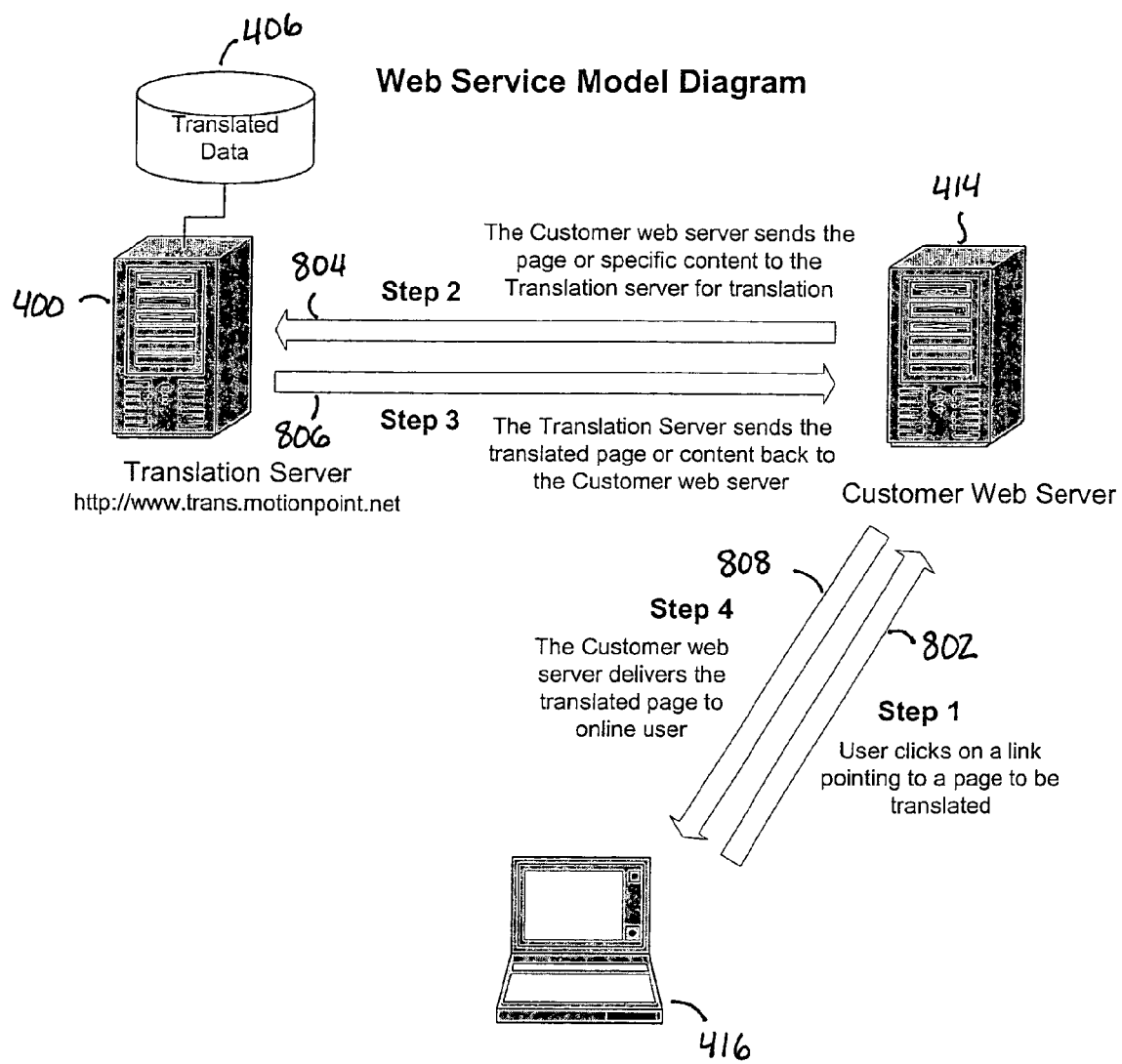
FIG. 8 is a block diagram depicting the serving process in a web service model of the translation server, according to a preferred embodiment of the present invention.

FIG. 8 is a block diagram depicting the serving process in a web service model of the translation server 400, according to a preferred embodiment of the present invention. In a first step 802, the user 416 clicks on a link of a web page in a first language on the web site 414. The link points to a page to be translated. The web site server 414 receives the request and processes it. In a second step 804, the web site 414 provides the page to the translation server 400 for translation. In a third step 806, the translation server 400 provides the translated page to the web site 414. In a fourth step 808, the web site 414 sends the translated page to the user 416.

Hosting and Management

The hosting and management model defines who deploys and manages the hardware and operating system software in which the software components of the present invention reside. There are two hosting and management models:

hosted & managed, and managed only. Alternately, the software can be licensed directly to the customer and the customer is responsible for both the hosting and management.

The hosted and managed model is a fully outsourced model in which one entity hosts the service and all translated data. Under this model, one entity deploys the translation server 400 and WebCATT 408 software on its own hardware. All hardware and software is provisioned and maintained by this entity, so the customer web site 414 has no responsibility for any hardware or software related to the service. In this model, the hosting entity is responsible for: 1) provisioning, installing, configuring and maintaining all hardware, including communication to the Internet 412, 2) installing, configuring and maintaining all operating system, web server and database server software, 3) installing, configuring and managing on an ongoing basis the translation server 400 and WebCATT 408 software and 4) maintaining staff and subcontractors that use the WebCATT 408 software to perform the translations that maintain the alternate language site in sync with the original language site.

In the managed only model, the translation server 400 and WebCATT 408 software are installed on the customer web site's hardware. In this model the customer web site 414 is responsible for: 1) provisioning, installing, configuring and maintaining all hardware, including communication to the Internet 412, 2) installing, configuring and maintaining all operating system, web server and database server software. The managing entity responsible for: 1) installing, configuring and managing on an ongoing basis the translation server 400 and WebCATT 408 software, 2) maintaining staff and subcontractors that use the WebCATT 408 software to perform the translations that maintain the alternate language site in sync with the original language site.

Dedicated Vs. Shared Servers

The components of the present invention can be deployed in dedicated or shared server environments. In a shared environment multiple customer web sites share the same hardware. In a typical scenario, multiple translation servers 400 are installed in the same web server 402, which connects to a database server containing the database 406 of translated data. A single WebCATT 408 software installation may is also shared by multiple customers. This setup is cost efficient and can be used for small and medium size sites with low-to-moderate web site traffic.

In a dedicated environment all hardware is dedicated to one customer web site 414. This is necessary for large organizations with heavy web site traffic and large amounts of text to be translated. In this case, either a single web server 402 or a cluster of web servers is dedicated to the customer. The database server is also normally dedicated to the customer. Dedicated servers assure guaranteed bandwidth for the customer and simplify keeping track of bandwidth usage for management and billing purposes.

Parsing & Translation

The system of the present invention does not save or maintain translated pages. Although, this may be useful for sites with static content, it becomes unmanageable for sites whose content is generated dynamically from database information in response to a user's request. Instead, the present invention stores only those components within a web page that require translation, i.e., translatable components.

Parsing is the process of breaking-up an HTML page submitted for translation into its translatable and non-translatable components. Non-translatable components simply pass through the system unchanged (except for URLs that need rewriting). Translatable components are processed and replaced by their translated counterparts if available. There are generally two types of translatable components in a web page: text segments and files. A translatable component includes any one of a text segment, an image file with text to be translated, a multimedia file with text or audio to be translated, a file with text to be translated, a file with image with to be translated, a file with audio to be translated and a file with video with at least one of text and audio to be translated.

A text segment is a chunk of text on the page as defined by the HTML that surrounds it. A text segment can range from a single word to a paragraph or multiple paragraphs. A file is any type of external content that resides on a file, is linked from within the page, and may require translation. Typical types of linked files found in web pages are images, PDF files, MS Word documents and Flash movies.

Below is an example of a very simple HTML page:

```
<html><head><title>Widget Product Information</title></head>
<body>Widget <b>Model# 123</b>
<p>This widget is very useful for many chores around the house.
<p><img src="img/widget_picture.gif" alt="Product photo">
<p><a href="http://www.abcwidgets.com">Click here to return to the
home page</a></body></html>
```

The above example page would by default be parsed into the following six text segments: 1) 'Widget Product Information', 2) 'Widget', 3) 'Model#123', 4) 'This widget is very useful for many chores around the house.', 5) 'Product photo', 6) 'Click here to return to the home page'. The above example page would further be parsed into the following one file: img/widget_picture.gif.

By default the parsing system breaks-up text segments according to the HTML tags in the page. In the above example, the sentence 'Widget Model#123' was broken up into two segments because there was an HTML bold tag (<b>) in the middle of it. However, the parsing system is flexible and allows defining, on per-customer basis, which HTML tags are formatting tags that should not break up text segments. So if we define the bold tag as a formatting tag, then the example page would instead be parsed into the following five text segments: 1) 'Widget Product Information', 2) 'Widget <b>Model#123</b>', 3) 'This widget is very useful for many chores around the house.', 4) 'Product photo', 5) 'Click here to return to the home page'.

The bold tags now became part of the second text segment, allowing the translator to place them in the correct location in the alternate language. For example, translating the text segment 'Widget <b>Model#123</b>' to Spanish will result in flipping the order of the 'Widget' and 'Model' words within the sentence. Since the bold tag is part of the text segment it can be moved so it still holds the word 'Model', as shown: <b>Modelo No. 123</b> de Artefacto Below is an example of how the example page is converted to Spanish by the translation server 400:

```
<html><head><title>Información del Artefacto</title></head>
<body>
<b>Modelo No. 123</b> del Artefacto
<p>Este artefacto es muy útil para todo tipo de trabajos en la casa.
<p><img src="http://www.trans l.motionpoint.netlimg/abcwidgets/
ES_24.gif" alt="Foto del Producto">
<p><a href=""http://trans l.motionpoint.netlabcwidgets/enes
/"?24;http://www.abcwidgets.com">Haga clic aqui para regresar a la
pagina principal</a></body><lhtrnl>
```

In order to convert the page, the translation server 400 performed several changes to the page. Each text segment was replaced with a corresponding translation. It is important to note that the text of the image description ('Product photo') placed in the 'alt' attribute of the image tag was recognized as a text segment and translated. The translation server 400 can recognize text segments inside attributes of HTML tags, such as the text in buttons of a form.

Further, the URL of the image tag was replaced to point to a translated image file. The translation server 400 only executes this action if a translated file has been defined (since many images do not have text and thus do not require translation), otherwise it does not change the URL of the image (except to make the URL absolute if it is not). In this example it is assumed that the 'ES_24.gif' image file was defined in WebCATT 408 as the translation for the 'widget_picture.gif' file.

The URL of the home page link was rewritten from 'http://www.abcwidgets.com' to 'http://trans1.motionpoint.net/abcwidgets/enes/?24; http://www.abcwidgets.com' in order to redirect it to the translation server 400. This is done so when the online user clicks on the 'Click here to return to the home page' link, the request will go directly to the translation server 400 and the home page will also be translated. This process is called implicit navigation and it is explained in more detail below.

Implicit Navigation

Implicit navigation is a translation server 400 feature that keeps an online user 416 in the alternate language as he/she browses a web site. Implicit navigation is implemented by rewriting the URLs in the applicable links inside a page as the page is being translated, so they are redirected to the translation server 400. As a result, not only is the page translated, but also all applicable links to other translated pages within the page are modified so that when the consumer clicks on the linked page it will also be automatically translated.

To rewrite a link, the translation server 400 prefixes the original URL with the URL of the translation server 400, so the original URL becomes the query string to the translation server 400 URL. When a rewritten link is clicked, the request goes to the translation server 400, which reads the query string to obtain the original URL to be translated and requests the page to be translated from this URL. The translation server 400 then converts the page received to the alternate language and delivers the translated page to the consumer directly.

When a link is rewritten, the original URL is only one part of the query string. The other part of the query string is a special numeric action ID, which provides information about the type of conversion request being performed.

The following describes some supported base action IDs. "1" indicates no action. "2" indicates pages that were not translated, or for which the translation did not meet the minimum translation percentage, and therefore should not be returned. "4" indicates HTML to be translated is being submitted as POST data when processing a POST request. If this action is not specified, then the URL passed in the query string is accessed in order to obtain the HTML to be translated. "8" indicates that all relative URLs in the HTML should be converted to absolute URLs. This is necessary only in GET requests. If relative URLs are not used in the document, this action should not be specified. "16" indicates implicit navigation is enabled. "32" indicates the request includes cookie data to be passed back as cookies to all URLs to be translated.

"64" indicates that all links in the page are to be disabled. This overrides action ID "16" if also specified. "128" indicates translation of the page is to be disabled. This is used to process tags without affecting content. "8192" indicates a translation is being requested from WebCATT 408 for previewing. The translation server 400 adds special HTML tags to the web page to allow highlighting translated as opposed to not-translated segments, disabling links to other pages, adding alternate language hover preview features, and allowing editing a segment or file by clicking on it in the preview page.

Actions may be combined by using the sum of the IDs as the action ID. For example, the following illustrates how implicit navigation is performed on a link of a fictional online retailer ABC Widgets: <a href="http://www.abcwidgets.com/product_listing.jsp? category=TV">See TV Products Listing</a>

In order to translate the listing page to Spanish, the link is rewritten as follows: <a href="http://trans1.motionpoint.net/abcwidgets/enes/?24; http://www.abcwidgets.com/product_listing.jsp?category=TV">See TV Products Listing</a>

In the above example the original URL is: http://www.abcwidgets.com/product_listing.jsp?category=TV The translation server 400 URL is: http://trans1.motionpoint.net/abcwidgets/enes/

And the action ID is "24", which means to enable implicit navigation and to convert relative URLs to absolute.

The scope of implicit navigation can be pre-defined by domain and/or URL patterns. In a typical scenario, only pages being served from a specific domain(s) should be translated. In the ABC Widgets example, if the implicit navigation domains are defined as abcwidgets.com and abcwidgets.net, then only URLs within those two domains will be rewritten. If a more granular translation is required, such as when translating only a part of a web site, then URL patterns can be used. For example, if ABC Widgets wishes not to translate the careers and investor relations sections of their site, then the following two example Exclude URL patterns could be used: 1) abcwidgets.com/careers/ and 2) abcwidgets.com/investor/

Any URLs for pages residing within the above two paths would not be rewritten and thus never translated. On the other hand, if ABC Widgets wishes only to translate its online product catalog, then the following example Include URL pattern could be used: abcwidgets.com/catalog/

In that case, only pages residing within the abcwidgets.com/catalog/ path are rewritten and thus translated. Include and Exclude URL patterns may be combined to better define the scope of the translation. Implicit navigation can also be controlled from within the HTML to be translated through the use of directive tags or directive attributes. These are explained in detail in below.

E-Commerce Database Language Enabling

The system of the present invention enables users to access the same original language e-commerce database in multiple languages. Since the translation server 400 processes web pages after they have left the customer web site 414, but before they reach the user 416, it does not affect a web server's e-commerce technology. As a result, the same web site 414 can be accessed in multiple languages, and all users are accessing the same e-commerce database simultaneously.

For example, an auction web site can allow users in different countries to bid on the same item. Each user can view the site and bid on the item in his native language. Since all bids from the different countries are actually hitting the same web site and the same e-commerce engine, all bids occur in real time and each user can see in real-time what all the other users in all other countries are bidding.

Text Segment Matching

When looking up a suitable translation for a text segment in an HTML page, a character-by-character comparison of the text in the segment against a database 406 of stored text segments is not ideal because it is very time consuming. As a result, in one embodiment of the present invention, the translation server 400 computes three 64-bit numeric hash codes from each incoming text segment. The hash code function is optimized to spread the resulting hash code across the full range of 64-bit numeric values (−9223372036854775808 to 9223372036854775807).

The three hash codes are computed as follows: 1) hash code 1 is based on all characters in the segment, 2) hash code 2 is based on the odd characters in the segment and 3) hash code 3 is based on the even characters in the segment. By distributing the hash code computations in this manner, the chances of key collisions are drastically reduced. The three computed hash codes make a composite key that represents each text segment in the memory caches and in the database. In the unlikely event that multiple text segments are represented by the same composite key, the translation server 400 will then resort to a character-by-character match.

Text Segment Locking

Occasionally, the meaning of a word or phrase may change depending on the context in which it's being used. It is also possible that the translation itself may vary depending on the context or placement of a text segment, even if the original meaning does not change. As a result, it may be necessary to specify multiple translations for the same word or phrase, one for each usage context. The text segment locking feature allows translators to do this by providing the ability to "lock" translated text segments together. When two or more translation text segments are locked together they are used only when the exact translation sequence is followed.

For example, the translation to Spanish of the text segment "Virtual Brochures" can vary, depending on where it is used. Below is this segment used in an English HTML sentence: <b>Virtual Brochures</b> are great. The corresponding translation to Spanish is: <b>Los Folletos Virtuales</b> son excelentes. Another example of a segment used in an English HTML sentence: There are many great <b>Virtual Brochures</b>. The corresponding translation to Spanish is: Hay muchos excelentes <b>Folletos Virtuales</b>

For this example, we assume that the HTML bold (<b>) tag is not defined as a formatting tag and, therefore, forces each sentence above to be broken up into two text segments each. As a result, the phrase "Virtual Brochures" becomes a separate text segment that requires a different translation for each case. Using the text segment locking feature in Web-CATT 408, the translator locks the "Los Folletos Virtuales" translated segment with the "son excelentes" translated segment in the first sentence, and the "Hay muchos excelentes" translated segment with the "Folletos Virtuales" translated segment in the second sentence.

At conversion time, when the translation server 400 encounters the "Virtual Brochures" segment in the first sentence it looks up a corresponding translated segment and gets back two potential matches: "Los Folletos Virtuales" and "Folletos Virtuales". It then proceeds to look up a translated segment for the next segment "are great" and gets back "son excelentes". Since "son excelentes" is locked to "Los Folletos Virtuales", the translation server 400 is able to determine that "Los Folletos Virtuales" is the correct translation to the previous segment "Virtual Brochures".

Form Posting

The translation server 400 transparently handles form submissions via GET or POST methods. This means that all form data is forwarded to the original URL that processes the form and that the response page is converted to the alternate language. The first step in the form handling is performed when an HTML page that has a form in it is being converted.

If the form is submitted via POST method, then the translation server 400 simply rewrites the URL in the ACTION attribute of the <FORM> tag. This is done by prefixing the original URL with the URL of the translation server 400, so the original URL becomes the query string to the translation server 400 URL, much like the implicit navigation feature in standard links. The browser will perform the POST request to the translation server 400, which will read the query string to obtain the original URL where the form is to be submitted and perform the POST to that URL, forwarding it all form data. The translation server 400 then reads the response page, converts it to the alternate language, and delivers the translated page to the user directly.

If the form is submitted via the GET method, then the translation server 400 cannot simply rewrite the URL in the ACTION attribute of the <FORM> tag because in a GET method the form data is sent in the query string. As a result, the browser would replace the original URL with the form data and the translation server 400 would not know to what URL to submit the form data. To overcome this limitation, the translation server 400 adds a hidden field to the form whose value contains the original URL, and replaces the URL in the ACTION attribute of the <FORM> tag so the request is sent to the translation server 400. The browser will perform the GET submission to the translation server 400, which will read the value of the hidden form field to obtain the original URL where the form is to be submitted and perform the GET submission to that URL, forwarding it all form data. The translation server 400 then reads the response page, converts it to the alternate language, and delivers the translated page to the consumer directly.

JavaScript/VBScript Handling

The translation server 400 is capable of translating text segments and files located inside JavaScript or VBScript code. Common types of files can be recognized automatically by their standard extensions. The translation server 400 parses all JavaScript code blocks and replaces the URLs of all files for which a translation exists so it points to the translated file. Non-standard file extensions and URL patterns may be defined on a per-customer basis to allow the translation server 400 to recognize less common or proprietary file formats, or even dynamically generated files. File recognition and translation can also be controlled from within the JavaScript code through the use of directive tags. These are explained in detail below. Text segments inside script code that require translation must be explicitly identified by placing a set of directive tags around the text.

Translation of content inside JavaScript or VBScript include files is also supported. A script include file is downloaded by the browser in a separate HTTP request and included in the web page as if it had appeared within the page. Include files are handled in the same manner as implicit navigation in standard links within the page. The URL of the include file is rewritten so the original include file is prefixed with the URL of the translation server 400 and the original file URL becomes the query string to the translation server 400 URL. The browser will then request the include file from the translation server 400, which will read the query string to obtain the URL of the original include file and request it from its location. The translation server 400 then reads the file, performs the appropriate conversions, and delivers the modified file to the browser for inclusion in the web page.

JavaScript include files are specified using the source (src) attribute m the <SCRIPT> tag, as shown: <script language="javascript" src="menu.js"></script>

Shown is an example of how the above script tag is rewritten so the content inside the JavaScript include file is translated: <script language="javascript" src="http://trans1.motionpoint.netlabcwidgets/enes/?24;http://www.abcwidgets.com/menu.js"></script>

Directive Tags and Attributes

Directive tags and directive attributes are special HTML tags and attributes that allow more granular control over the translation and implicit navigation within in a web page. Directive tags are special HTML comments tags that are ignored by the browser, but provide specific instructions to the translation server 400. Directive attributes are specially named attributes placed within an HTML tag that are also ignored by the browser, but provide specific instructions to the translation server 400 that apply only to the tag in which the attribute is placed.

Translation control tags and attributes are used to specify sections on a web page that should not get translated. One important use of translation control tags is to delimit personal information, such as a persons name, address, credit card numbers, etc. that may show up in a web page, but which should not be processed—it simply passes through the translation server 400 without being translated or stored—for security and privacy issues.

Following is an exemplary list of directive tags. The directive tag "mp_trans partial_start & mp_trans_partial_end" signals the start and end of a partial translation section. This tag may be used at the top of a web page in conjunction with section translate tags to selectively translate sections of a page. The directive tag "mp_trans_enable start & mp_trans_enable_end" signals the start and end of a section to be translated within a partial translation section. All text and files within this section are translated. The directive tag "mp_trans_disable_start & mp_trans_disable_end" signals the start and end of a section not to be translated when in normal translation mode. The directive tag "mp_trans_machine_start & mp_trans_machine_end" signals that any text segments enclosed within the tags may be machine translated in the event that a human translation is not available.

Following is a list of directive attributes. The directive attribute "mpdistrans" disables translation of a file or of translatable text in a tag, such as alt, keywords or description meta-tag, or form buttons.

Below is an example of usage of translation control directive tags and attributes:

```
<html><head>
<meta name="description" content="This page description is translated">
<meta mpdistrans name="keywords" content="These keywords are not translated, keyword1, keyword2, keyword3, keyword4, keywordS">
<title>This title is translated</title></head><body>
```

This text and the image widget1.gif below are translated.

```
<img src="img/widget1.gif" alt="This image description is translated">
<p><img mpdistrans src="img/widget2.gif" alt="This image and this description are NOT translated because of the mpdistrans attribute">
<!-- mp_trans_disable_start -->
```

This text and the image widget3.gif below are NOT translated because they are inside a translation disabled section.

```
<img src="img/widget3.gif.gif" alt="This image description is NOT translated">
<!-- mp_trans_disable_end -->This text is translated.
<!-- mp_trans_partial_start -->This text is NOT translated because it is inside a partially translated section and not specifically designated as translatable content.
<!-- mp_trans_enable_start -->This text is translated because it is inside a partially translated section and it is specifically designated as translatable content.
<!-- mp_trans_enable_end -->This text is NOT translated because it is inside a partially translated section and not specifically designated as translatable content.
<!-- mp_trans_partial_end -->This text is translated.</body></html>
```

Following is a list of directive attributes for implicit navigation control. The directive attribute "mpnav" enables implicit navigation for listed attributes in the tag. This attribute can be used for tags that do not normally contain URLs, but do. The directive attribute "mpdisnav" disables implicit navigation for all attributes or only listed attributes of the tag. The directive attribute "mporgnav" forces original navigation for all attributes or only listed attributes of the tag. Original navigation will remove redirection to the translation server if found, otherwise it will leave the link intact. This directive attribute is discussed below with reference to one-link deployment.

Below is an example of usage of implicit navigation control directive attributes.

```
<html><body>ABC Widgets Home Page
<p><a href="widgets.jsp">See all useful widgets</a>
<p><a mpdisnav href="uselesswidgets.jsp>See useless widgets</a>
<p><form action="showwidget.jsp method="post"><select name="WidgetSel">
<option value SELECTED>Select a widget to view:</option>
<option mpnav="value" value="widget1.jsp">Widget 1</option>
<option mpnav="value" value="widget2.jsp">Widget 2</option>
</select></form></body></html>
```

The translation server 400 would process the above page as follows:

```
<html><body>Pagina Principal de ABC Widgets
<a href="http://trans l.motionpoint.netlabcwidgets/enes/?24;
http://www.abcwidgets.com/widgets.jsp">ver artefactos útiles</a>
<p><a mpdisnav href="uselesswidgets.jsp>Ver artefactos inútiles </a>
<p><form action="http://trans1.motionpoint.net/abcwidgets/enes/?24;
http://www.abcwidgets.com/showwidget.jsp" method="post">
<select name="WidgetSel">
<option value SELECTED>Escoga un artefacto para verlo:</option>
<option mpnav="value"
```

```
value="http://trans1.motionpoint.net/abcwidgets/enes/?24;http://www.abcwidgets.com/widge
tl.jsp">Artefacto 1</option>
<option mpnav="value"
value="http://trans1.motionpoint.net/abcwidgets/enes/?24;http://www.abcwidgets.com/widge
t2.jsp">Artefacto 2</option>
</select></form></body></html>
```

It can be seen above that implicit navigation was not performed for the anchor (<A>) tag with the mpdisnav attribute. As a result, when the user clicks on the 'Ver artefactos inútiles' link, the uselesswidgets.jsp web page is not redirected to the translation server 400 and therefore it is not translated. Furthermore, the mpnav attribute placed in the two <OPTION> tags instructed the translation server 400 to perform implicit navigation on the URL specified in the value attribute of each tag.

Following is a list of directive tags for JavaScript/VBScript control. The directive tag "mp_trans_textjs_start & mp_trans_textjs_end" signals the start and end of a section inside a script block that contains text to be translated. The directive tag "mp_trans_imgjs_start & mp_trans_imgjs_end" signals the start and end of a section inside a script block that contains images, PDF, Flash or other files to be translated. Under most circumstances these tags are not needed as the translation server 400 JavaScript parser can automatically recognize common types of files by their standard extensions.

The directive tag "mp_trans_supressurljs_start & mp_trans_supressurljs_end" signals the start and end of a section inside a script block that inhibits the processing of URLs. URLs are processed for implicit navigation, or to convert relative URLs to absolute URLs if implicit navigation is disabled. This tag may be necessary to avoid processing portions of URLs that are used to build up a final URL by means of concatenation.

Below is an example of usage of script control directive tags:

```
<script language="Javascript"><!--function CheckLoginForm( )
{       <!-- mp_trans_textjs_start -->
var usermsg ="User name is required\n";
var pswdmsg ="Password is required\n";
var hdrmsg ="Please correct the following errors:\n";
<!-- mp_trans_textjs_end --> var message="";
if(document.LoginForm.login_user.value = "") {
message=message + usermsg;        }
if(document.LoginForm.login_pass.value = "") {
message=message + pswdmsg;        }
if(message = "") {
document.LoginForm.submit( );     } else {
message= hdrmsg +message; alert(message);}}//--></script>
```

The above CheckLoginForm function verifies that an online user has entered a login name and password before posting the LoginForm form in the page. If a user has not entered the required information, then a pop-up alert box shows an error message with details. The text of the various error messages is assigned to variables and enclosed in a set of 'mp_trans_textjs' directive tags so it can be recognized and translated.

"One-Link" Deployment

One of the primary goals of the TransMotion system is to eliminate or minimize the workload of a customer web site's IT department in order to deploy an alternate language web site. The one-link deployment feature allows a customer to deploy the alternate language web site by simply placing one language-switching link in the home page of the original language site.

The one-link deployment is a combination of two features: (1) automatic flipping of the language-switching link, and (2) implicit navigation to maintain the user in the alternate language. Automatic flipping of the language-switching link is specified by using the mporgnav directive attribute in the language-switching link. The mporgnav directive attribute instructs the translation server 400 to rewrite the URL to support automatic language switching.

Below is an example of a very simple home page:

```
<html><body>Welcome to the ABC Widgets Home Page
<p><a href="widgets.jsp">Click here to see all widgets we sell</a>
</body></html>
```

In order to deploy a mirror Spanish language web site all that has to be done is place one link in the home page that redirects the home page to ABC Widget's translation server 400. Below is an example of the above home page with the new language-switching link added:

```
<html><body>Welcome to the ABC Widgets Home Page<p>
<a mporgnav href="http://trans 1.motionpoint.net/abcwidgets/enes/?24;
http://www.abcwidgets.com">Click here to see this site in Spanish</a>
<p><a href="widgets.jsp">Click here to see all widgets we sell</a>
</body></html>
```

When a user clicks the 'Click here to see this site in Spanish' language-switching link, the translation server 400 returns the home page translated, as shown below:

```
<html><body>Bienvenidos ala Pagina Principal de ABC Widgets<p>
<a mporgnav href="http://www.abcwidgets.com">Haga clic aqui para ver
este sitio web en Ingles</a><p>
<a href="http://trans 1.motionpoint.netlabcwidgets/enes/?24;
http://www.abcwidgets.com/widgets.jsp">Haga clic aqui para ver todos
los artefactos que vendemos</a></body></html>
```

As shown above, in addition to translating the page, the translation server 400 also rewrites the URL in the language-switching link and performs implicit navigation of all other URLs in the page. The translation server 400 rewrites the URL in the language-switching link so that the translation server 400 redirection is removed. The mporgnav directive attribute is used to instruct the translation server 400 to do this. In addition, the link text 'Click here to see this site in Spanish' is translated as 'Haga clic aqui para ver este sitio web en Ingles' (which means 'Click here to see this site in English'). This automatic and simultaneous change of both the URL and the text (or image) in the language-switching link by the translation server 400 is what allows the user to flip back-and-forth between English and Spanish.

Implicit navigation is also performed in all the links on the page. In the above example home page, it was performed on the widgets.jsp page. As a result, when a user clicks on this rewritten link, the widgetsjsp page is in turn translated and implicit navigation performed on all of its links within the abcwidgets.com domain. This process is repeated so that the user is always navigating the site in the alternate language.

Customized Content

The translation server 400 allows delivering customized content according to the language and/or locale that a user is viewing the site in. When the translation server 400 requests a web page for translation, it sends two cookies to the original web server called 'mptranslan' and 'mptranscty'. The value of the 'mptranslan' cookie is a 2 or 3-letter (upper-case) language code in compliance with the ISO 639 standard. The value of the 'mptranscty' cookie is a 2-letter (upper-case) country code in compliance with the ISO 3166 standard.

Web site server software can determine if a page is being viewed in an alternate language and/or a different country by checking for these cookies. For example, by checking that the 'mptranslan' cookie exists, and that its value is 'ES', a web server can determine that a page is being served in Spanish and customize the content being served, such as showcasing items that appeal more to Hispanics. In addition, if a company maintains operations in multiple countries, then it can use the 'mptranscty' cookie to determine the country and show only products sold or shipped to that country.

Internal Search Engine Integration

When an online user 416 that is viewing a web site 414 in an alternate language performs an internal site search, it is natural for the user to enter the search keyword(s) in the alternate language. When the translation server 400 forwards the search keyword(s) to the original web site, the search engine will not be able to find any matching results, or might deliver incorrect results. This occurs because the web server search engine is matching the keyword(s) in the alternate language against a search index of keywords that are in the original language.

The translation server 400 provides an elegant solution to this problem by performing a real-time reverse machine translation on the search keyword(s) and forwarding the keyword(s) to the web server search engine in the original language. Reverse machine translation is configured so it is performed only on the specific keyword field(s) of the search form(s) in a web site.

Internet Search Engine Compatibility

The system of the present invention is compatible with all Internet search engines, such as Google or AltaVista. These search engines utilize content from both the body and head of the HTML document to index a web page. To ensure transparent compatibility with Internet search engines, the system of the present invention translates all applicable text in the head of the document. This includes the page title, the page description meta-tag, and the keywords meta-tag.

Integration with Machine Translation

The translation server 400 can use real-time machine translation in the event that a human translation is not yet available for a text segment. This an optional setting that can be specified per-customer, per-URL pattern and/or by means of directive tags.

Efficient Caching

Caching frequently used data in memory is necessary to minimize round trips to the database 406. There are two types of caches being used: dynamic and static. A dynamic cache is one whose entries are removed from the cache when memory becomes scarce, and use a Most-Recently-Used (MRU) algorithm to keep the most relevant entries in the cache. The use of an MRU algorithm to manage the cache guarantees that the most frequently accessed and most recently used entries are always in the cache. This type of cache is used for large, long-lived caches.

In a static cache, entries cannot be removed automatically when memory becomes scarce. This type of cache is normally used for small, short-lived caches, but is also used for long-lived caches that will not grow too large and whose entries must remain in the cache. The translation server 400 contains five memory caches, which are described in more detail below.

A main segment cache is a dynamic long-lived cache that stores ACTIVE translated text segments keyed by the composite key derived from the original (not yet translated) text segment's 64-bit hash codes. This allows a quick lookup of translation text. Segments are removed from this cache if they are deactivated in the WebCATT 408. A translation queue segment cache is a dynamic long-lived cache that stores the text segments of all pages that are in the translation queue. This allows the translation server 400 to determine that a specific text segment that has not yet been translated is already in the queue for translation without having to search the database. Segments are removed from this cache when they are activated in the WebCATT 408.

A main file cache is a dynamic long-lived cache that stores ACTIVE files keyed by their names. This allows the quick lookup of a translated file. Files are removed from this cache if they are deactivated in the WebCATT 408. A translation queue file cache is a dynamic long-lived cache that stores the files of all pages that are in the translation queue. This allows the translation server 400 to determine that a file that has not yet been translated is already in the queue for translation without having to search the database. Files are removed from this cache when they are activated in the WebCATT 408.

A translation queue page cache is a static long-lived cache that stores all pages that are in the translation queue. This allows the translation server 400 to determine that a page that has not yet been translated is already in the queue for translation without having to search the database. A 64-bit hash code is used to determine if a page in the queue has changed and has to be re-scheduled for translation. Pages are removed from this cache when they are activated in the WebCATT 408.

The translation server 400 is advantageous as it does not require IT integration with an existing web site infrastructure. The present invention converts the outbound HTML stream after it has left the client web server 414. Thus, there is no need to re-architect an existing web site or build a separate web site for alternate language. Further, there is no client storage or management of translated data required. Translated data is managed and maintained by the WebCATT 408 software outside of the wed site's database.

The translation server 400 is further advantageous as it works with any client web server hardware and software technology infrastructure. Further, it allows for evolution of the existing client's hardware and software technology infrastructure. Moreover, deployment of the present invention requires minimal effort as a reduced amount of client IT resources are required. The one-link deployment feature involves the client placing one link on the web site 414 to provide access to the alternate language web site. Therefore, deployment is rapid and cost effective.

WebCATT

The WebCATT (Web Computer Aided Translation Tool) 408 is a web based Graphical User Interface (GUI) application that is used to perform and manage human translations. The tool is built specifically for web (HTML) page translations. It can be used by professional translators to translate web site translatable components and by managers to manage the translation process. Since WebCATT 408 is a web-based application that is accessed via the Internet 412, translators and managers can be located in different geographical areas.

WebCATT 408 is similar to other computer aided translation tools used by professional translation service organizations. WebCATT 408 supports localization, text recognition, fuzzy matching, translation memory, internal repetitions, alignment, and a glossary/terminology database. WebCATT 408 is designed for web site translation and includes other features optimized for web translation, such as What You See Is What You Get (WYSIWYG) HTML previewing and support for image/graphic translation.

WebCATT 408 organizes the translation workload into web pages. A web page is the HTML content generated by a specific URL address, regardless of whether that content is static (i.e., physically resides in the web server in a file with a html extension), or dynamic (i.e., the content is generated dynamically by combining information from a database and HTML templates). Dynamic pages that are dependent on session information (i.e., a shopping cart checkout page) are also supported.

Within a web page there are two types of units of translation that translators work with: text segments, and files. A text segment is a chunk of text on the page as defined by the HTML that surrounds it. A text segment can range from a single word to a paragraph or multiple paragraphs. A file is any type of external content that resides on a file, is linked from within the page, and may require translation. Typical types of files found in web pages are images, PDF files, MS Word documents and Flash movies. A file is translated by uploading a replacement file that has all text and/or sounds translated.

Figure 9:
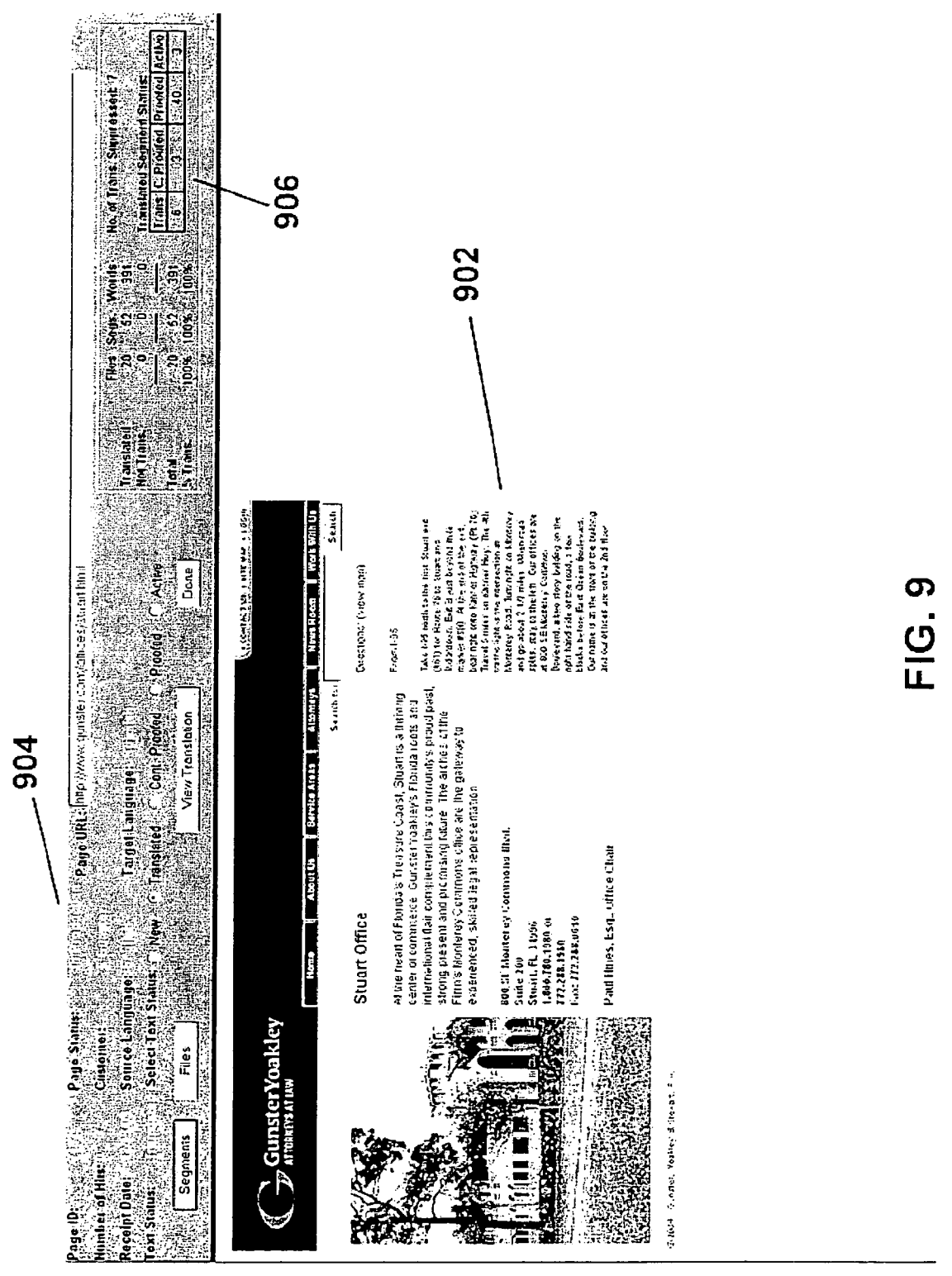

FIG. 9 is a screenshot of a WebCATT interface used for viewing a translatable component, in one embodiment of the present invention. FIG. 9 shows a display area 902 in which a web page including translatable component in a first language (in this case, English) is displayed. Also shown in FIG. 9 is a section 904 including information associated with the web page displayed in display area 902, such as page status, page URL, page ID, etc. Further shown in FIG. 9 is a section 906 including statistics associated with the web site from which the displayed web page is garnered, such as the number of files translated, the number of segments translated, the number of translations suppressed, etc.

Figure 10:
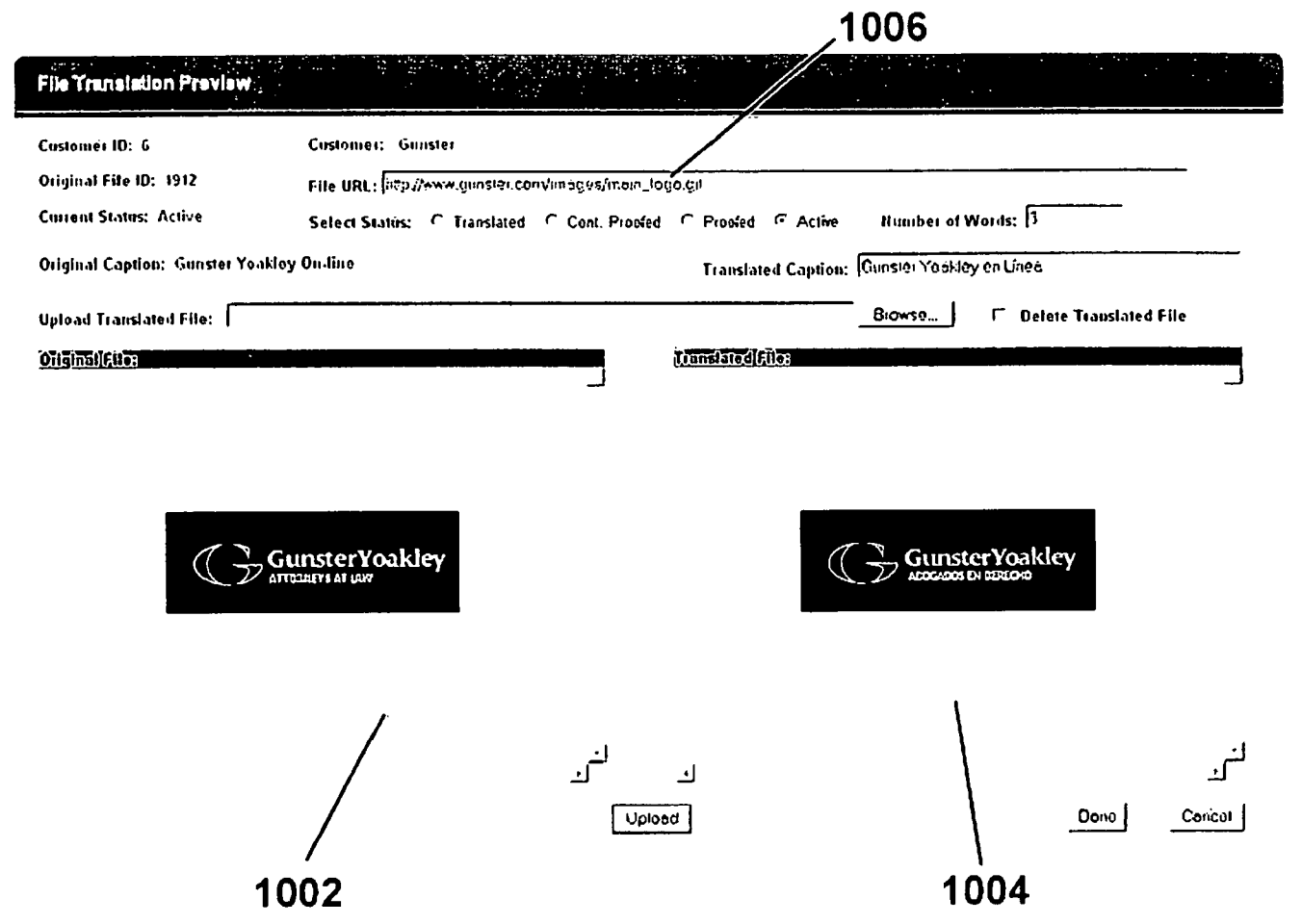

FIG. 10 is a screenshot of a WebCATT interface used for viewing a translatable component along with a corresponding translation, in one embodiment of the present invention. FIG. 10 shows a display area 1002 in which an original image file translatable component is displayed in a first language (in this case, English). FIG. 10 shows a display area 1004 in which a translated image file is displayed in a second language (in this case, Spanish). Also shown in FIG. 10 is a section 1006 including information associated with the file displayed in display areas 1002-1004, such as file status, file URL, file ID, etc. FIG. 10 shows how WebCATT 408 allows a user to view a translatable component alongside a corresponding translated component for comparison.

Figure 11:
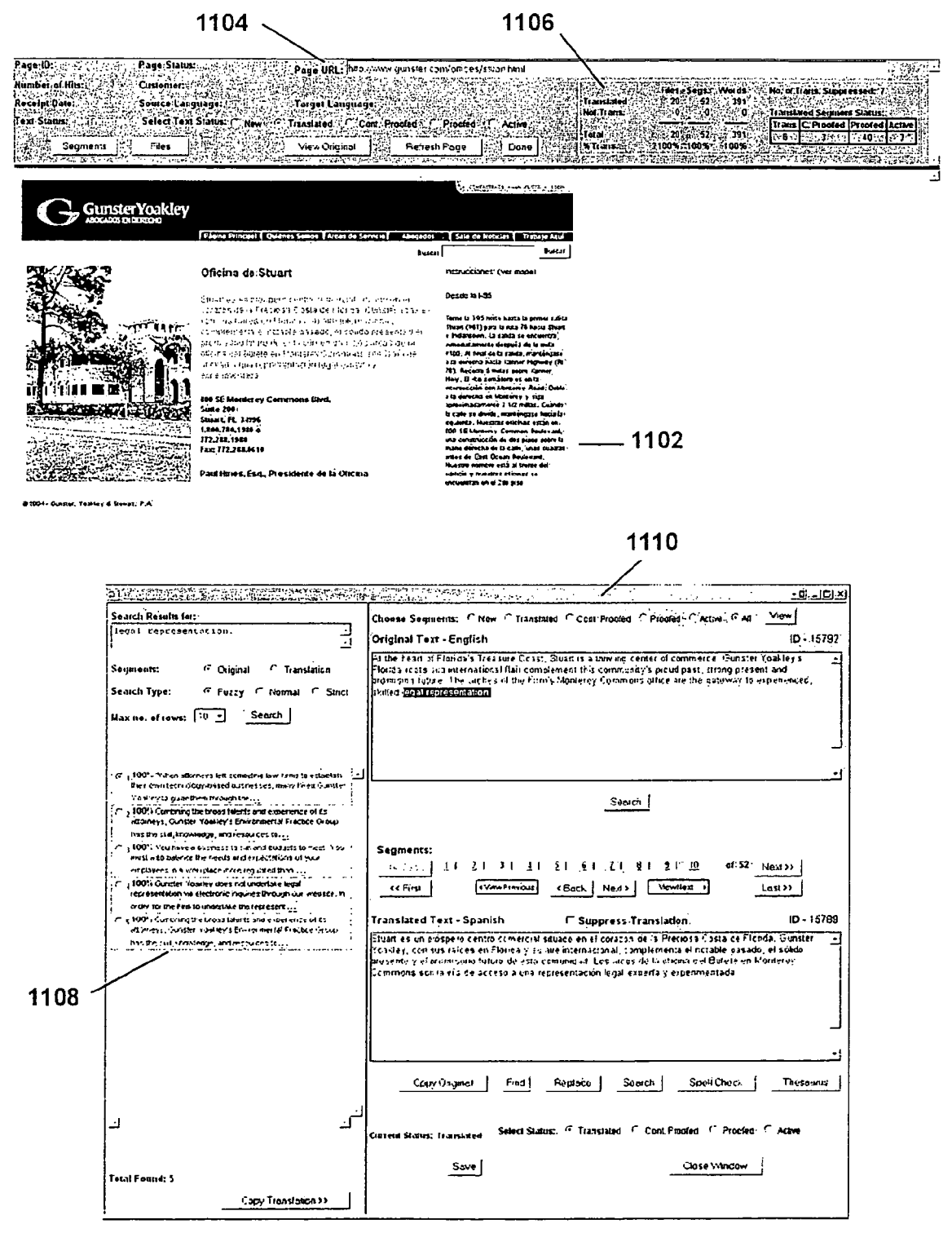

FIG. 11 is a screenshot of a WebCATT interface used for editing a translatable component, in one embodiment of the present invention. FIG. 11 shows a display area 1102 in which a web page including a translated component in a second language (in this case, Spanish) is displayed. The display area 1102 provides a WYSIWYG web page preview feature that allows viewing the translated web page as it is being translated. Translations can often result in a significant amount of word growth (e.g., approx. 20% from English to Spanish) or shrinkage, which can result in carefully formatted web page layouts being knocked out of alignment by the longer text. The WYSIWYG page preview feature allows translators to immediately see the translated web pages and quickly make adjustments in word choice in order to maintain the correct alignment and layout of the page when translated.

Also shown in FIG. 11 is a section 1104 including information associated with the web page displayed in display area 1102, such as page status, page URL, page ID, etc. Further shown in FIG. 11 is a section 1106 including statistics associated with the web site from which the displayed web page is garnered, such as the number of files translated, the number of segments translated, the number of translations suppressed, etc. In addition to each of those statistics, a breakdown of translated and not translated components is shown in both units and percentages.

A section 1110 provides a text segment edit form that allows a translator to edit text segments in the order they appear on the page. This form features a fuzzy search feature that automatically shows and sorts existing segment matches in the database. The translator can copy an existing translation from the search results area to use as a starting translation.

A section 1108 provides a file list form that allows a translator to preview all linked files on the page. The list form allows the translator to select all files that do not require translation (e.g., an image with no text) and quickly tag them as such. It also allows a translator to select individual files for translation via the file edit form. File translation involves uploading a translated file and translating the file text description if present.

The GUI of FIG. 11 allows a user to view the plurality of translated components placed into the format derived from the first, or source, content, thereby enabling a user to review how the translated components are rendered in the first content format. The GUI of FIG. 11 further allows a user to highlight any of the plurality of translatable components, which are not yet translated, differently from translated components when previewing the plurality of translated components in the first content format. The GUI of FIG. 11 further allows a user to display text when hovering over a translated component so as to view the first content corresponding to the translated component.

The GUI of FIG. 11 further allows a user to select at least one of the translated components when previewing the plurality of translated components in the first content format so as to edit the translated component and store the translated component that has been revised with the corresponding unique identifier. Lastly, the GUI of FIG. 11 further allows previewing in a multi-user environment so that more than one user can simultaneously view translated components rendered in the first content format.

WebCATT 408 also provides complete management of the translation process. Web pages are scheduled for translation either automatically by the translation server 400, or manually by a manager via upload of web pages or other type of content to be translated. When a web page is scheduled for translation it is placed in the translation queue of a specific customer. Pages to be translated are scheduled for translation on a priority basis using algorithms based on the percentage of the page already translated and how often the page is being accessed on the original web server while it's in the translation queue. This allows the most important pages (i.e., most frequently accessed and those with smaller changes) to be translated first.

Once pages are in the queue, a manager can assign them for translation to a specific translator or translation service subcontractor. If assigned to a subcontractor, a subcontractor manager can then assign them to specific translators within the subcontractor organization or even to freelancers that work with them. Proofers can also be assigned. A subcontractor can assign its own proofers to pages and managers can also assign proofers to check the work of translators or subcontractors.

A web page must go through a series of status changes before it is available via the Internet. A page can have any of the following statuses: NEW, IN-PRODUCTION, and ACTIVE. When a page is placed in the queue its status is NEW. When a translator first accesses the page for the purpose of translating it, its status is changed to IN-PRODUCTION. After the page is fully translated and proofed, then a manager changes its status to ACTIVE. Only ACTIVE pages available via the Internet.

In addition to the page statuses, the text and files within the page maintain their own translation status. The status for text segments and files is maintained both at the page level (i.e., one single overall status for all segments in the page and another one for all files in the page) and individually. A text segment or file can have any of the following statuses: NEW, TRANSLATED, CONTRACTOR_PROOFED, PROOFED and ACTIVE. The initial status is NEW. After a translator translates the text or file the status is changed to IN-PRODUCTION. When the translation is proofed by a subcontractor proofer the status is changed to CONTRACTOR_PROOFED and when it is proofed by an internal proofer the status is changed to PROOFED. Finally the manager changes the status to ACTIVE. A page can only be activated after all segments and files within it are ACTIVE.

Figure 12:
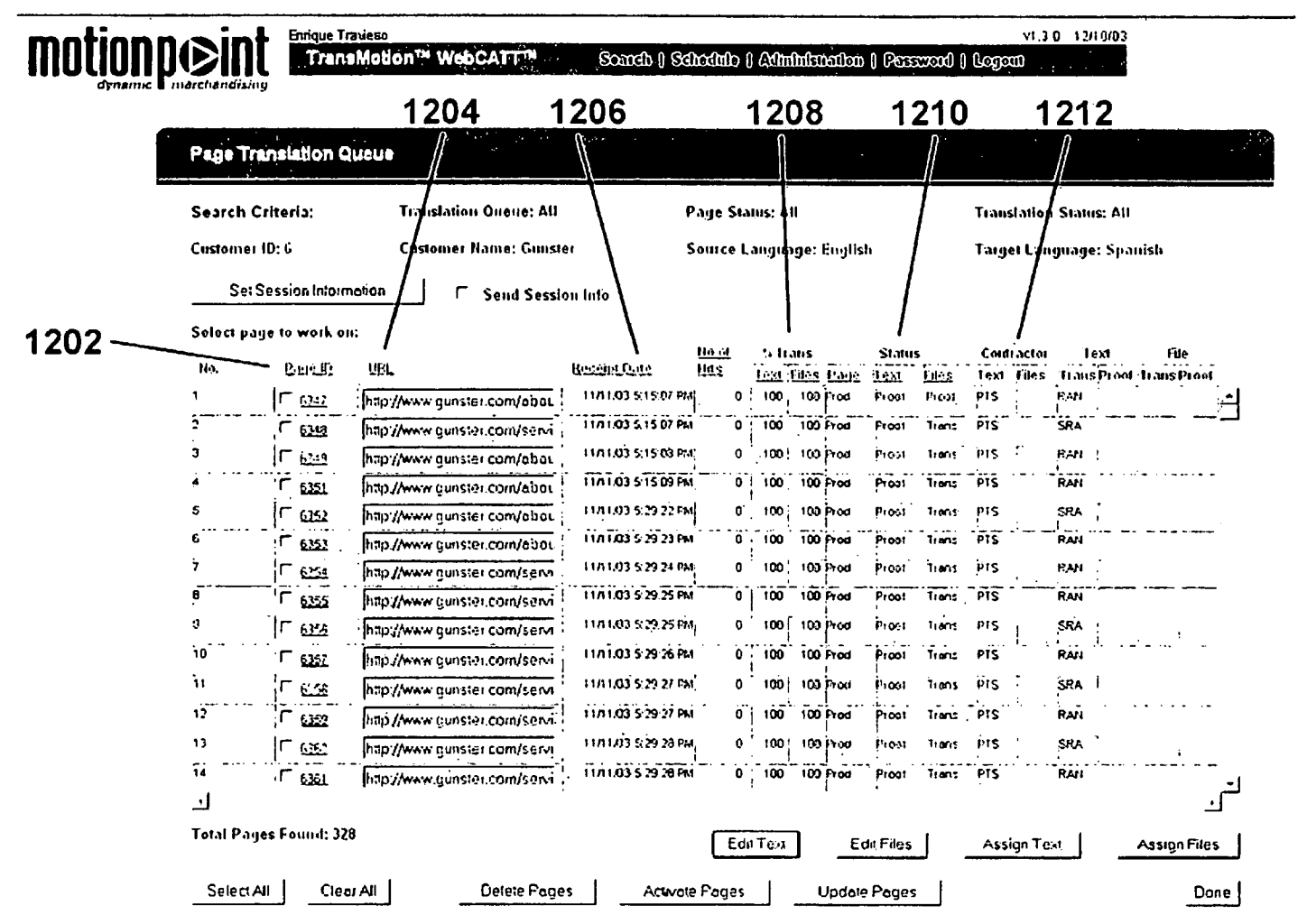

FIG. 12 is a screenshot of a WebCATT interface used for viewing a translation queue, in one embodiment of the present invention. FIG. 12 shows a series of columns wherein a unit of information is provided for each page of the web site 414 listed on each row. FIG. 12 shows a first column 1202 including unique page identifiers. Column 1204 includes a URL for each page. Column 1206 includes receipt data for each page. Column 1208 includes a percentage statistic indicating the percentage of the page that has been translated. Column 1210 indicates a status for each page. Column 1212 indicates the contractor assigned to the page.

Figure 13:
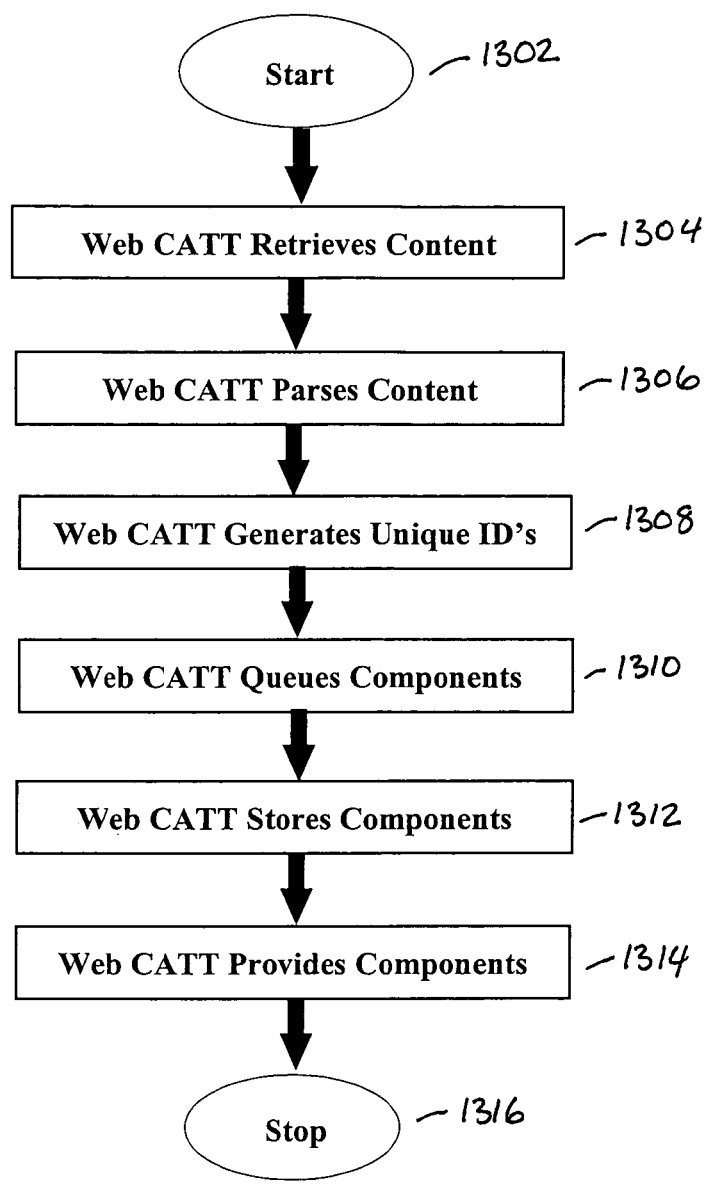
FIG. 13 is an operational flow diagram depicting the process of WebCATT, according to a preferred embodiment of the present invention.

FIG. 13 is an operational flow diagram depicting the process of WebCATT 408, according to a preferred embodiment of the present invention. The operational flow diagram of FIG. 13 depicts the process by which WebCATT 408, which provides a web based tool for managing language translations of content, queues and translates components of a web site 414. The operational flow diagram of FIG. 13 begins with step 1302 and flows directly to step 1304.

In step 1304, WebCATT 408 retrieves a first content, or HTML source page, in a first language from the web site 414. In step 1306, WebCATT 408 parses the first content into a plurality of translatable components. In step 1308, WebCATT 408 generates a unique identifier for each of the plurality of translatable components of the first content. In step 1310, WebCATT 408 queues the plurality of translatable components and corresponding unique identifiers for human or machine translation into a second language.

In step 1312, for each of the plurality of translatable components, WebCATT 408 stores a translated component and an associated unique identifier corresponding to the translatable component, thereby storing a plurality of translated components and corresponding unique identifiers. In step 1314, WebCATT 408 provides the plurality of translatable components and corresponding unique identifiers to a third party for human translation into a second language. In step 1316, the control flow of FIG. 13 stops.

WebCATT 408 is advantageous as it allows translators to work directly with live pages off the web site 414 being translated. Thus, the client web site 414 need not send information to the translation server 400 for translation. Furthermore, all web pages in a web site are automatically entered into the translation work queue by the WebCATT 408 spider 404, described in greater detail below.

WebCATT 408 is further advantageous as WYSIWYG preview allows translators to see translated web pages, as they would appear on the live web site. This allows the translator to compensate for word growth or shrinkage that knocks a web page layout out of alignment. Furthermore, a translated preview page is marked-up with special HTML & JavaScript to allow: 1) color coding of all text in the web page so the translator can see what is already translated, what remains to be translated and where the current text segment is located within the page, 2) clicking in text or a file to take the translator to a form to edit the translation for the text or file and 3) hovering the mouse over a text or file to pop up a window showing the original wording or file.

WebCATT 408 is further advantageous as pages are parsed into its translatable components and translators only work with these components, not a complex group of HTML files. All HTML and script code is hidden when using WebCATT 408. WebCATT 408 is further beneficial as it can be utilized via the ASP model and translators can access it via the web. Translated pages can be delivered via the translation server 400 or saved as static html pages to be sent to client, wherein links among pages are modified so they reference the translated pages.

WebCATT 408 is further beneficial as it allows management of the translation process. Multiple user access levels are supported: managers, proofers, translators & sub-contractors. Mangers can assign work in the translation queue to translators, proofers and/or subcontractors. Subcontractor managers can in turn sub-assign work to subcontractor translators and proofers. Managers must activate web pages before the translation server 400 can deliver them.

TransScope

A spider is a program that visits web sites and reads their pages and other information in order to create entries for an index such as a search engine index. For example, the major search engines on the Internet all have such a program, which is also known as a "crawler" or a "bot." Spiders are typically programmed to visit web sites that have been submitted by their owners as new or updated. Entire web sites or specific pages can be selectively visited and indexed. Spiders are called spiders because they usually visit many web sites in parallel at the same time, their "legs" spanning a large area of the "web." Spiders can crawl through a web site's pages in several ways.

One way a spider can crawl through a web site is to follow all the hypertext links in each page until all the pages have been read. The spiders for the major search engines on the Internet adhere to the rules of politeness for Web spiders that are specified in a standard for robot exclusion. This standard asks each server which files should be excluded from being indexed. It does not (or can not) go through a firewall. The standard also proscribes a special algorithm for waiting between successive server requests so that the spider doesn't affect web site response time for other users.

The operations of a spider are in contrast with a normal web browser operated by a human that doesn't automatically follow links other than inline images and URL redirection. The algorithm used by spiders to pick which references to follow strongly depends on the spider's purpose. Index-building spiders usually retrieve a significant proportion of the references. The other extreme is spiders that try to validate the references in a set of documents. These spiders usually do not retrieve any of the links apart from redirections.

FIG. 4 shows a spider 404 for use in analyzing and sizing a web site 414. The spider 404 is a tool that crawls specific web sites and performs any of a variety of actions. The spider 404 can crawl a web site in order to populate the WebCATT translation queue with new or updated information. The spider 404 may also gather content statistics that can be used to provide a monetary quote for deployment of the present invention.

Figure 14:
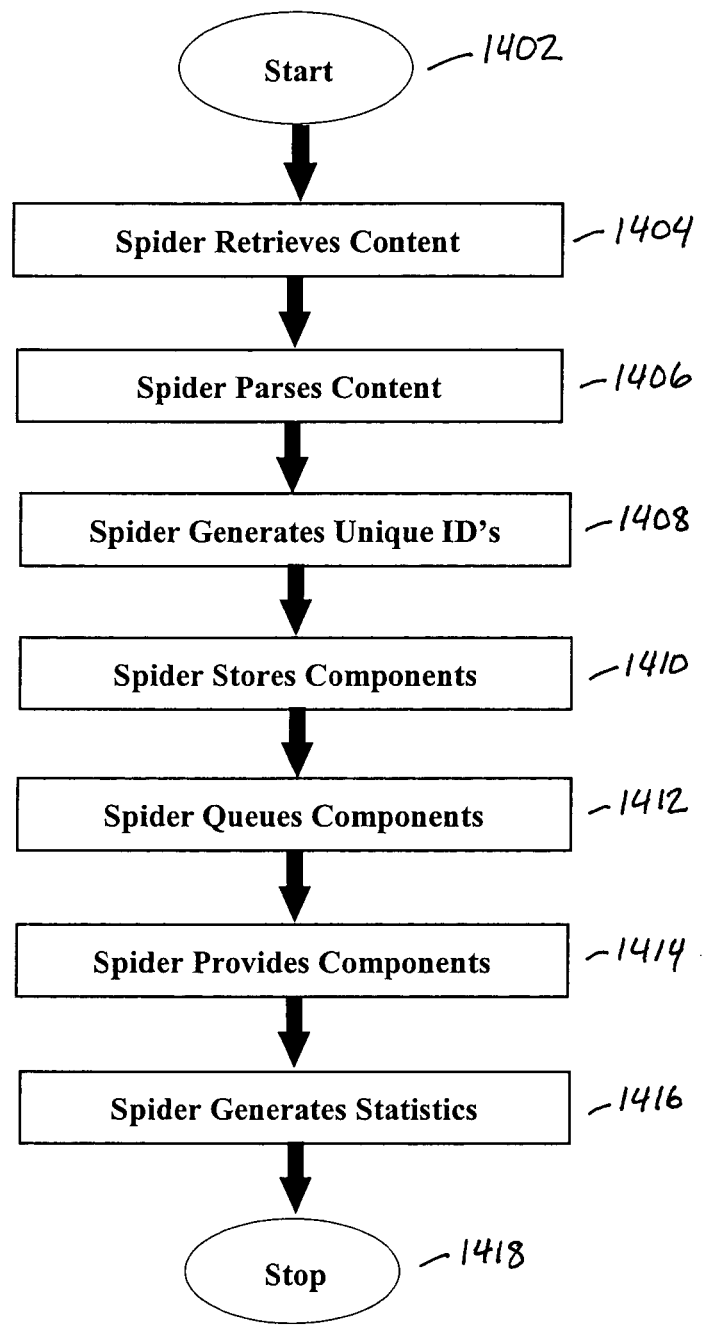
FIG. 14 is an operational flow diagram depicting the process of the spider, according to a preferred embodiment of the present invention.

FIG. 14 is an operational flow diagram depicting the process of spider 404, according to a preferred embodiment of the present invention. The operational flow diagram of FIG. 14 depicts the process by which spider 404, which provides a web based tool for sizing a web site for language translation, retrieves and indexes translatable components of a web site 414. The operational flow diagram of FIG. 14 begins with step 1402 and flows directly to step 1404.

In step 1404, spider 404 retrieves a first content, or HTML source page, in a first language from the web site 414. The first content in a first language is for translation into a second content in a second language. The second web content is a human or machine translation in a second language of the first web content. In step 1406, spider 404 parses the first content into a plurality of translatable components. A translatable component includes any one of a text segment, an image file with text to be translated, a multimedia file with text or audio to be translated, a file with text to be translated, a file with image with to be translated, a file with audio to be translated and a file with video with at least one of text and audio to be translated.

In step 1408, spider 404 generates a unique identifier for each of the plurality of translatable components of the first content. For a text segment, the translation server 400 can generate a unique identifier using a hash code, a checksum or a mathematical algorithm. In step 1410, spider 404 stores the plurality of translatable components and corresponding unique identifiers in the database 406 for human or machine translation into the second language.

In optional step 1412, spider 404 queues the plurality of translatable components and corresponding unique identifiers for human or machine translation into a second language. In optional step 1414, spider 404 provides the plurality of translatable components and corresponding unique identifiers to WebCATT 408 for human translation into a second language. In step 1416, spider 404 generates statistics based on the translatable components retrieved from the web site 414.

The statistics generated include a file count, a page count, a translatable segment count, a unique text segment count, a unique text segment word count and a word count. The spider 404 can further generate a web page having a link to each file of the web site 414. In step 1418, the control flow of FIG. 14 stops.

The spider 404 can be pre-configured for each customer web site so that the use of directive tags and/or attributes is eliminated or minimized. This minimizes the workload of the customer web site's IT personnel. Further, the spider 404 can be separately pre-defined by domain and/or by URL pattern. This allows specifying sections of a web site to be translated without the need for placing directive tags in each web page.

The spider 404 is advantageous as it can be used to update the WebCATT 408 translation work queue. Further, spider 404 can be used to gather statistics about a web site 414 in order to allow estimating the amount of work involved in translating the web site and pricing accordingly. Spider 404 can summarize word counts, segment counts, file counts and page counts of a web site 414. The spider 404 is further efficient and supplements the functions of WebCATT 408 as it works to save all unique text segments and file URLs in the database 406 for later translation into a second language. It can further create an HTML page containing links to all files of web site 414, so the files can reviewed for translation at a later time.

The spider 404 is efficient in navigating a crawling a web site 414 as it can emulate a browser by saving and returning cookies. Spider 404 can further fill out and submit forms with pre-defined information and is able to establish a session and normalize session ID parameters for e-commerce sites. Spider 404 can further be configured to crawl only specific areas of a web site by defining include/exclude domains and URL patterns. Spider 404 can also be configured to send specific HTTP headers, such as the user-agent (i.e., type of browser). Spider 404 can be executed in a single computer or in distributed mode. In distributed mode, multiple machines work in conjunction to crawl the same web site simultaneously sharing the same database 406.

TransSync

Most web sites are continuously updated with new information, but maintaining an alternate language web site up to date presents a challenge when using traditional methods. The system of the present invention provides an elegant solution to this problem by providing various methods to maintain an alternate language web site up to date.

Automatic maintenance involves automated maintenance of the alternate language web site so as to be maintained in synchronization with the original site with no human intervention or little additional effort. Automatic maintenance is based on a function of the translation server 400. Specifically, the function wherein the translation server 400 automatically schedules a web page for translation by placing it in the WebCATT 408 translation queue (described in more detail above) in the event a translation cannot be found for one or more text segments or linked files in the page. Thus, the act of viewing a never-before translated or a modified page in the alternate language enables the scheduling of the web page for translation.

There are several ways to take leverage the auto-scheduling function of the translation server 400. One way involves manual quality assurance review. If a new web page or an updated web page goes through a manual quality assurance process that involves a person reviewing the page before it is released to the live web site, then the quality assurance personnel simply attempts to view the page in the alternate language during the review process. This will place the new web page in the WebCATT 408 translation queue for translation before the page goes into the production (live) web site. General Information and Policy type web pages are good candidates for this process.

Another way to take leverage the auto-scheduling function of the translation server 400 involves the spider agent 404. In the case of web pages that do not undergo an individual quality assurance review before going into production, the spider agent 404 can be used to crawl a web site, or just portions of a web site, in the alternate language on a regular basis. Crawling the web site in the alternate language is equivalent to a user viewing the site in the alternate language, and thus results in any new or modified pages being placed in the WebCATT 408 translation queue.

This technique is ideal for regularly scheduled updates to a web site, which normally happens after hours. For example, if the ABC Widgets web site modifies its sale offerings twice a week, such as on Mondays and Fridays at 12 AM, then the spider agent 404 can be scheduled to crawl the relevant parts of the site shortly after (e.g., at 12:30 AM) on those days. Around-the-clock translators can then translate the new sale banners so that the alternate language web site is up to date sometime later that morning.

The spider agent 404 can also be used to regularly (e.g., daily) crawl a web site even when changes are not regularly scheduled. This will guarantee that the alternate language site is in sync with the original language site after every crawl and subsequent translation.

Another way to take leverage the auto-scheduling function of the translation server 400 involves user access. Even if no manual quality assurance reviews or scheduled spider agent 404 crawls are performed, the alternate language web site is still automatically maintained up to date over the long term. This is because the first online user that attempts to view a new or modified page in the alternate language will trigger the placement of that page into the WebCATT translation queue. In that case, the online user will see the page in the original language or will see a partially translated page, depending on the amount of new content in the page and the pre-defined customer-specified translation threshold. However, subsequent users that access the page will see the web page in the alternate language after it has been translated.

In addition to automatic maintenance, the present invention also supports manual maintenance of the alternate language web site so as to be maintained in synchronization with the original site. New information that needs translation can also be manually placed in the translation queue using WebCATT 408. This can be useful to translate large amounts of data that is available in advance of it being on the live web site 414. For example, if the ABC Widgets web site updates its web site with new product offerings every Thursday morning and all product information is available by the previous Tuesday, then all new product data can be manually hatched into the translation queue using WebCATT 408 as soon as it is available so it is fully translated by the time the new web pages go live.

Population of the WebCATT 408 translation queue can be performed either by URL or by content. Population by URL means that translation server 400 stores only the URL of the page in the queue. The content of the URL is retrieved afterwards when a translator accesses the page to translate it using WebCATT 408. Population by URL can present a problem if the content of the page is dependent on session information, such as a session ID present in a query parameter or stored in a cookie. In that case, the session ID in the query parameter may have expired or the session information stored in the cookie will not be present when viewing the page in WebCATT 408. This is usually the case in shopping cart or account access pages.

Session dependent pages can be handled in two ways: (1) by replicating the session state via cookies and/or updated session parameters, or (2) by populating the page by content. Replicating the session state means that the translator must manually re-acquire a session from the original site and then enter the session data in WebCATT 408. Once the session data is entered it can be used for translating multiple pages. Population by content means that translation server 400 stores the full content of the page in the queue. This avoids the session dependence issue, but can result in outdated content. As a result, population by content is only used for session dependent pages, and population by URL, which guarantees that the content being translated is the latest content, is used for all other pages.

Access to the WebCATT 408 translation queue is segmented by customer and prioritized. Pages to be translated are scheduled for translation on a priority basis using algorithms based on the percentage of the page already translated and how often the page is being accessed on the original web server while the page is in the translation queue. This allows the most important pages (i.e., most frequently accessed and those with smaller changes) to be translated first.

A file change detection feature can be used to deal with files whose names have been changed. The translation server 400 and WebCATT 408 can match a file to be translated with its translated file by the URL of the original file. However, it is possible for a file to be changed while its name and location remain the same. In that case, it is possible that an outdated translated file is used for the translation.

To overcome this issue, the translation server 400 computes a hash-code or checksum based on the binary content of the file and stores it with the URL. At conversion time, each time a file is presented for translation the translation server 400 re-computes the hash-code or checksum and compares it against the stored one. If they match, the file has not changed and the existing translated file can be used as replacement. However, if they do not match, the binary content of the file was changed and the existing file translation cannot be used. In that case, the page that contains the file is placed in the WebCATT 408 translation queue so the file may be re-translated.

Figure 15:
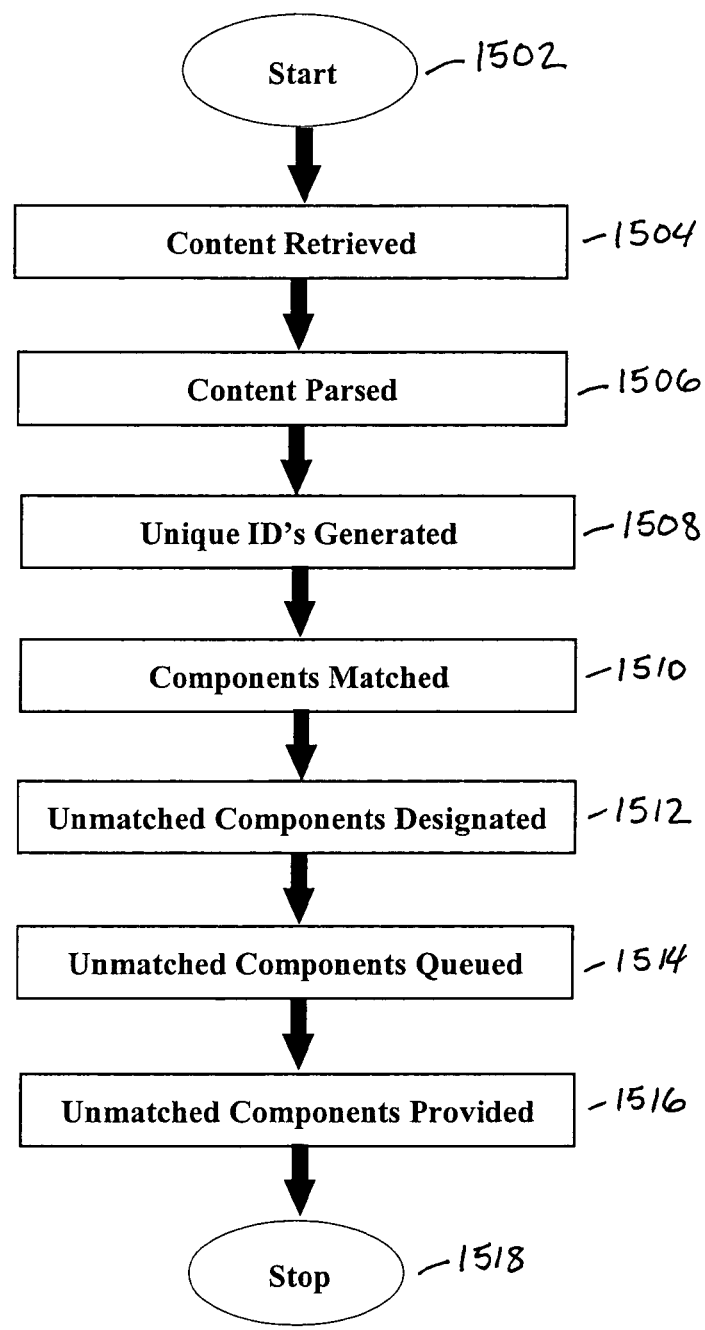
FIG. 15 is an operational flow diagram depicting the synchronization process according to a preferred embodiment of the present invention.

FIG. 15 is an operational flow diagram depicting the synchronization process according to a preferred embodiment of the present invention. The operational flow diagram of FIG. 15 depicts the automated maintenance process of the alternate language web site so as to be maintained in synchronization with the original web site 414. The operational flow diagram of FIG. 15 begins with step 1502 and flows directly to step 1504.

In step 1504, a first content in a first language, or HTML source page, is retrieved from the web site 414. The first content in a first language is for translation into a second content in a second language. The second web content is a human or machine translation in a second language of the first web content. In step 1506, the first content is parsed into a plurality of translatable components.

In step 1508, a unique identifier is generated for each of the plurality of translatable components of the first content. For a text segment, a unique identifier is generated using a hash code, a checksum or a mathematical algorithm.

In step 1510, a plurality of translated components of the second web content are identified or matched using the unique identifier of each of the plurality of translatable components of the first web content. If a translatable component of the first web content is not matched to a translated component of the second web content, in step 1512, the translatable component is designated for translation into the second language. In optional step 1514, the plurality of translatable components that weren't matched are queued for human or machine translation into a second language. In optional step 1516, the plurality of translatable components that weren't matched are provided to WebCATT 408 for translation into a second language. In step 1518, the control flow of FIG. 15 stops.

Exemplary Implementations

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

An embodiment of the present invention can also be embedded in a computer program product, which comprises all the features enabling the implementation of the methods described herein, and which—when loaded in a computer system—is able to carry out these methods. Computer program means or computer program as used in the present invention indicates any expression, in any language, code or notation, of a set of instructions intended to cause a system having an information processing capability to perform a particular function either directly or after either or both of the following a) conversion to another language, code or, notation; and b) reproduction in a different material form.

A computer system may include, inter alia, one or more computers and at least a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer system to read such computer readable information.

Figure 16:
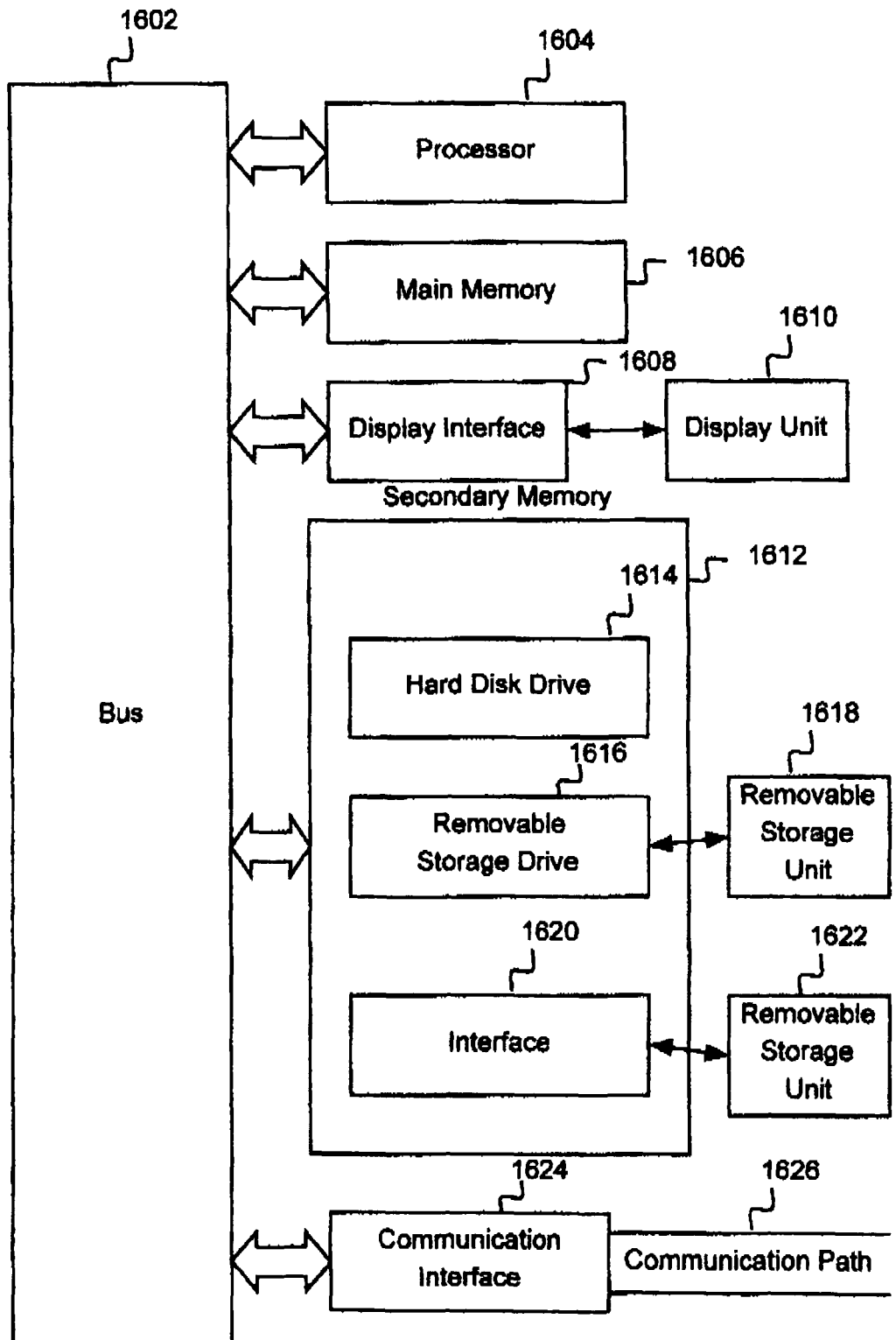
FIG. 16 is a block diagram showing a computer system useful for implementing the present invention.

FIG. 16 is a block diagram of a computer system useful for implementing an embodiment of the present invention. The computer system includes one or more processors, such as processor 1604. The processor 1604 is connected to a communication infrastructure 1602 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 1608 that forwards graphics, text, and other data from the communication infrastructure 1602 (or from a frame buffer not shown) for display on the display unit 1610. The computer system also includes a main memory 1606, preferably random access memory (RAM), and may also include a secondary memory 1612. The secondary memory 1612 may include, for example, a hard disk drive 1614 and/or a removable storage drive 1616, representing a floppy disk drive, a magnetic tape drive, an optical disk drive, etc. The removable storage drive 1616 reads from and/or writes to a removable storage unit 1618 in a manner well known to those having ordinary skill in the art. Removable storage unit 1618, represents a floppy disk, magnetic tape, optical disk, etc. which is read by and written to by removable storage drive 1616. As will be appreciated, the removable storage unit 1618 includes a computer usable storage medium having stored therein computer software and/or data.

In alternative embodiments, the secondary memory 1612 may include other similar means for allowing computer programs or other instructions to be loaded into the computer system. Such means may include, for example, a removable storage unit 1622 and an interface 1620. Examples of such may include a program cartridge and cartridge interface (such as that found in video game devices), a removable memory chip (such as an EPROM, or PROM) and associated socket, and other removable storage units 1622 and interfaces 1620 which allow software and data to be transferred from the removable storage unit 1622 to the computer system.

The computer system may also include a communications interface 1624. Communications interface 1624 allows software and data to be transferred between the computer system and external devices. Examples of communications interface 1624 may include a modem, a network interface (such as an Ethernet card), a communications port, a PCM-CIA slot and card, etc. Software and data transferred via communications interface 1624 are in the form of signals which may be, for example, electronic, electromagnetic, optical, or other signals capable of being received by communications interface 1624. These signals are provided to communications interface 1624 via a communications path (i.e., channel) 1626. This channel 1626 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 1606 and secondary memory 1612, removable storage drive 1616, a hard disk installed in hard disk drive 1614, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information.

Computer programs (also called computer control logic) are stored in mam memory 1606 and/or secondary memory 1612. Computer programs may also be received via communications interface 1624. Such computer programs, when executed, enable the computer system to perform the features of the present invention as discussed herein. In particular, the computer programs, when executed, enable the processor 1604 to perform the features of the computer system. Accordingly, such computer programs represent controllers of the computer system.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A machine implemented method for providing statistics characterizing translation work in synchronizing content in different languages, comprising the steps of:
    activating a spider agent to crawl a website for content in a first language via a publicly accessible network path for synchronizing a translated version of the content in the first language previously generated in a second language;
    parsing the crawled content in the first language into a plurality of translatable components;
    accessing a database that stores translated components previously generated in the second language;
    identifying at least some of the plurality of translatable components in the first language that do not have a corresponding translated component in the second language in the database;
    generating statistics based on the identified translatable components to estimate the work load involved in language translation of the identified translatable components from the first language to the second language; and
    providing information including the generated statistics to characterize a service related to synchronizing the content in the first and second languages.

2. The method according to claim 1, wherein the language translation includes human translating the identified translatable components.

3. The method according to claim 1, further comprising the step of adding the identified translatable components to a translation list for translation into a second language.

4. The method according to claim 1, further comprising the step of generating an identifier for each of the plurality of translatable components such that each of the plurality of translatable components is accessible via a corresponding identifier.

5. The method according to claim 4, wherein the identifier for a text segment is generated using at least one of a hash code, a checksum, and a mathematical algorithm based on one or more text segments.

6. The method according to claim 1, wherein the statistics includes at least one of a file count, a page count, a text segment count, a unique text segment count, a word count, and a unique word count.

7. The method of claim 1, wherein the step of generating comprises:
    computing the statistics based on information associated with any of the identified translatable components that does not have a corresponding translated component in the second language.

8. A machine readable non-transitory medium having information stored thereon for providing statistics characterizing translation work in synchronizing content in different languages, wherein the information, when read, causes the machine to perform the following:
    activating a spider agent to crawl a website for content in a first language via a publicly accessible network path for synchronizing a translated version of the content in the first language previously generated in a second language;
    parsing the crawled content in the first language into a plurality of translatable components;
    accessing a database that stores translated components previously generated in the second language;
    identifying at least some of the plurality of translatable components in the first language that do not have a corresponding translated component in the second language in the database;
    generating statistics based on the identified translatable components to estimate the work load involved in language translation of the identified translatable components from the first language to the second language; and
    providing information including the statistics to characterize a service related to synchronizing the content in the first and second languages.

9. The medium according to claim 8, wherein the language translation includes human translating the identified translatable components.

10. The medium according to claim 8, wherein the information, when read, further causes the machine to perform the following: adding the identified translatable components to a translation list for translation into a second language.

11. The medium according to claim 8, wherein the information, when read, further causes the machine to perform the following: generating an identifier for each of the plurality of translatable components such that each of the plurality of translatable components is accessible via a corresponding identifier.

12. The medium according to claim 11, wherein the identifier for a text segment is generated using at least one of a hash code, a checksum, and a mathematical algorithm based on one or more text segments.

13. The medium according to claim 8, wherein the statistics includes at least one of a file count, a page count, a text segment count, a unique text segment count, a word count, and a unique word count.

14. The medium according to claim 8, wherein the step of generating comprises:
    computing the statistics based on information associated with any of the identified translatable components that does not have a corresponding translated component in the second language.

* * * * *